(12) United States Patent
Honjo et al.

(10) Patent No.: US 10,973,103 B2
(45) Date of Patent: Apr. 6, 2021

(54) PRESENCE AND DIRECTIONAL MOTION DETECTION

(71) Applicant: GOOGLE LLC, Mountain View, CA (US)

(72) Inventors: Shigefumi Honjo, Mountain View, CA (US); Jung Hong, Mountain View, CA (US); Andrew Goldenson, Belmont, CA (US); Lawrence Chang, Palo Alto, CA (US); Marci Meingast, San Francisco, CA (US); Adam Cutbill, Mountain View, CA (US); Amber Volmering, Newark, CA (US); Jeffrey Yu, San Francisco, CA (US); Anurag Gupta, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/260,048

(22) Filed: Jan. 28, 2019

(65) Prior Publication Data

US 2020/0245423 A1    Jul. 30, 2020

(51) Int. Cl.
*G08B 21/22* (2006.01)
*H05B 47/105* (2020.01)
*G06N 20/00* (2019.01)
*F21V 23/04* (2006.01)

(52) U.S. Cl.
CPC ......... *H05B 47/105* (2020.01); *F21V 23/045* (2013.01); *F21V 23/0471* (2013.01); *G06N 20/00* (2019.01)

(58) Field of Classification Search
CPC ... G08B 21/22; H05B 47/105; F21V 23/0442; F21V 23/0471
See application file for complete search history.

(56) References Cited

U.S. PATENT DOCUMENTS

| | | | | |
|---|---|---|---|---|
| 4,000,400 A * | 12/1976 | Elder | ........................ | G07C 9/00 377/2 |
| 10,037,673 B1 * | 7/2018 | Gray | ...................... | G08B 21/22 |

\* cited by examiner

*Primary Examiner* — Hongmin Fan
(74) *Attorney, Agent, or Firm* — Butzel Long

(57) ABSTRACT

Systems and techniques are provided for presence and directional motion detection. Signals may be received from a sensor positioned in a structure. An indication of directional motion may be generated based on the signals from the sensor. The indication of directional motion may be generated without using signals from additional sensors. A control signal for a device in the structure may be generated in response to the indication of directional motion. The control signal may be sent to the device in the structure to be implemented by the device.

30 Claims, 29 Drawing Sheets

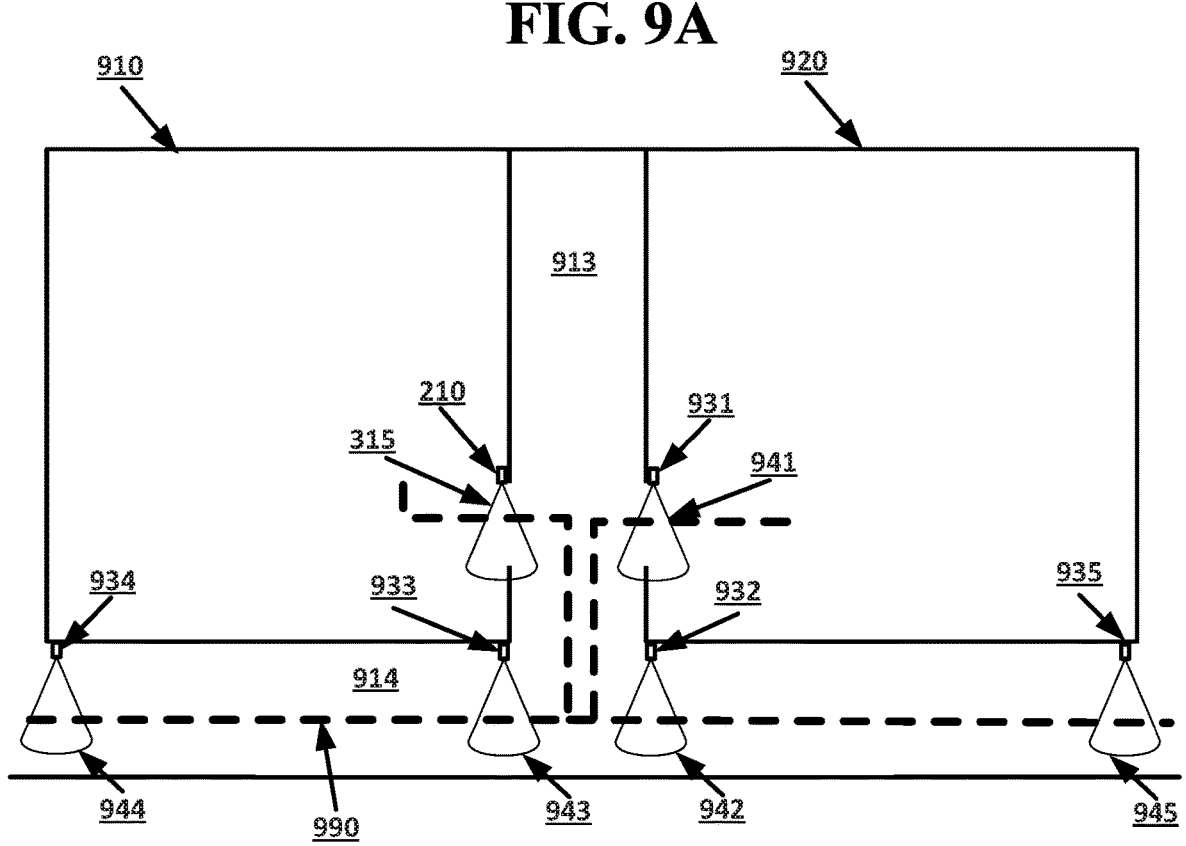

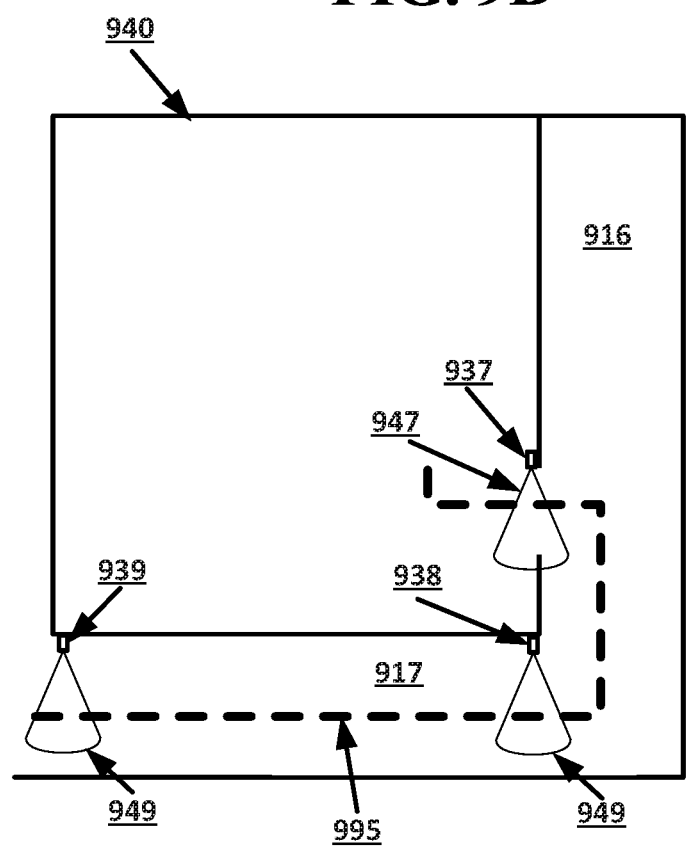

PRESENCE AND DIRECTIONAL MOTION DETECTION

BACKGROUND

Sensors may be used to monitor the rooms of a structure. Data from the sensors may be used to determine where individual occupants are within a structure. Determining the direction of motion of occupants within the structure may require multiple sensors.

BRIEF SUMMARY

According to an embodiment of the disclosed subject matter, signals may be received from a sensor positioned in a structure. An indication of directional motion based on the signals from the sensor may be generated. The indication of directional motion may be generated without using signals from additional sensors. In response to the indication of directional motion, a control signal may be generated for a device in the structure. The control signal may be sent to the device in the structure to be implemented by the device.

Signals may be received from sensors in the structure. A substructure of the structure may be identified based on a pattern of motion determined based on the signals from the sensors. A map of the structure may be updated based on the identified substructure and the location of one or of the sensors whose signals were used to determine the pattern of motion.

Signals may be received from sensors in the structure. Context data including the time of day may be received. A pattern of motion may be identified based on the context data and directional motion determined from the signals from the sensors. A model of motion patterns may be updated with the identified pattern of motion.

Additional signals may be received from the sensors in the structure. Additional context data including the time of day may be received. It may be determined if the additional context data and directional motion determined from the additional signals corresponds to a pattern of motion in the model of motion patterns or diverges from the patterns of motion in the model of motion patterns.

When the additional context data and the directional motion determined from the additional signals corresponds to the pattern of motion in the model of motion patterns, a second control signal may be generated for the device in the structure in response to determining that the additional context data and the directional motion determined from the additional signals corresponds to a pattern of motion in the model of motion patterns. The second control signal may be sent to the device in the structure to be implemented by the device.

When the additional context data and the directional motion determined from the additional signals diverges from the patterns of motion in the model of motion patterns, an alert indication may be generated in response to determining that the additional context data and the directional motion determined from the additional signals diverges from the patterns of motion in the model of motion patterns. The alert indication may be sent to a communications device. The alert indication may include an indication of unexpected motion or an indication of lack of expected motion.

Sensor counts may be received from sensors in the structures. The sensors counts may include counts that are incremented when a sensor detects a person passing in front of the sensor in a first direction and decremented when the sensor detects a person passing in front of the sensor in a second direction. Sensor counts from sensors that monitor entryways to the same rooms may be collated to generate room counts. The room count for a room may be the summation of sensor counts from sensors that monitor entryways to that room. A second control signal for the device in the structure may generated based on a room count. The second control signal may be sent to the device in the structure to be implemented by the device.

The sensor may include a PIR sensor including a first sensor pad and a second sensor pad where the first sensor pad may be configured to produce a positive pulse signal when the first sensor pad detects motion and a second sensor pad may be configured to produce a negative pulse signal when the second sensor pad detects motion, an asymmetric lens sensor including two asymmetric lenses or apertures that focus radiation on a detector and cause the detector to generate pulse signals of different sizes based on the size of a lens or aperture of the two asymmetric lenses or apertures that focused radiation on the detector, a radar sensor, or an ultrasonic sensor.

According to an embodiment of the disclosed subject matter, a means for receiving signals from a sensor positioned in an entryway in a structure, a means for generating an indication of directional motion based on the signals from the sensor, wherein the indication of directional motion is generated without using signals from additional sensors, a means for, in response to the indication of directional motion, generating a control signal for a device in the structure, a means for sending the control signal to the device in the structure to be implemented by the device, a means for receiving signals from sensors in the structure, a means for identifying a substructure of the structure based on a pattern of motion determined based on the signals from the sensors, a means for updating a map of the structure based on the identified substructure and the location of one or of the sensors whose signals were used to determine the pattern of motion, a means for receiving signals from sensors in the structure, a means for receiving context data including the time of day, a means for identifying pattern of motion based on the context data and directional motion determined from the signals from the sensors, a means for updating a model of motion patterns with the identified pattern of motion, a means for receiving additional signals from the sensors in the structure, a means for receiving additional context data including the time of day, a means for determining if the additional context data and directional motion determined from the additional signals corresponds to a pattern of motion in the model of motion patterns or diverges from the patterns of motion in the model of motion patterns, a means for in response to determining that the additional context data and the directional motion determined from the additional signals corresponds to a pattern of motion in the model of motion patterns, generating a second control signal for the device in the structure, a means for sending the second control signal to the device in the structure to be implemented by the device, a means for in response to determining that the additional context data and the directional motion determined from the additional signals diverges from the patterns of motion in the model of motion patterns, generating an alert indication, a means for sending the alert indication to a communications device, a means for receiving sensor counts from sensors in the structures, the sensors counts including counts that are incremented when a sensor detects a person passing in front of the sensor in a first direction and decremented when the sensor detects a person passing in front of the sensor in a second direction, a means for collating sensor counts from sensors that monitor entryways to the same rooms to generate room counts, wherein the room count for a room is the summation of sensor counts from sensors that monitor entryways to that room, a means for generating a second control signal for the device in the structure based on a room count, and a means for sending the second control signal to the device in the structure to be implemented by the device, are included.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 9A shows an example environment suitable for presence and directional motion detection according to an implementation of the disclosed subject matter.

FIG. 9B shows an example environment suitable for presence and directional motion detection according to an implementation of the disclosed subject matter.

DETAILED DESCRIPTION

Figure 1:
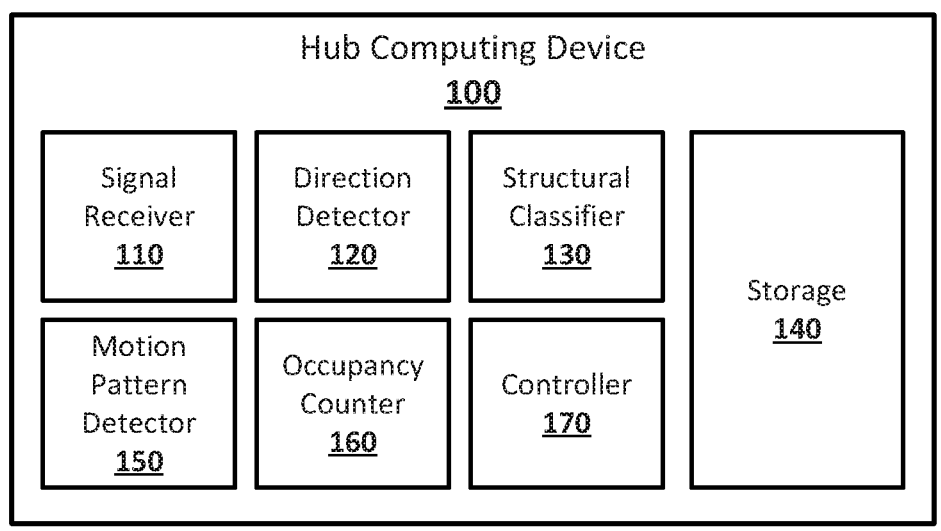
FIG. 1 shows an example system suitable for presence and directional motion detection according to an implementation of the disclosed subject matter.

According to embodiments disclosed herein, presence and directional motion detection may allow for the use of a single sensor to determine both the presence and directional motion of an occupant relative to a room of a structure. Data generated by the single sensor may be used to detect both the presence of a person, and the direction that person is moving in. For example, the data generated by a single sensor may be able to determine whether a person is entering or exiting a room. A machine learning system may be trained using data from a single sensor to develop a direction sensing algorithm for that single sensor. The directional motion of a person, as determined using data from the single sensor, may be used to control various aspects of the structure, such as the lights in the room where the single sensor is located. Data generated by multiple sensors in the structure may be used to determine the directional motion of occupants throughout a structure. Patterns of directional motion may be used to map the structures, such as hallways, of a structure. A machine learning system may be trained using data from multiple sensors to associate motion patterns with the substructures of the structure that produce the motion patterns. Directional motion may also be combined with other data, such as the time of day, to determine common motion patterns for the structure. A machine learning system may be trained using directional motion, the time of day, day of the week, geo-location data, and any other suitable data about a structure, to determine patterns of motion for the structure. The determined patterns of directional motion may then be used to detect anomalies in the motion detected within a structure, to automate various aspects of the structure and to generate localized intruder alerts. Sensors used to detect presence and directional motion may be used to count the number of people that have entered or exited a room in order to maintain a count of the number of people in a room. Various sensor types may be may be used to detect directional motion. Sensors may be paired to detect the directional motion. Single sensors may also be used to detect directional motion. For example, a single PIR sensor with multiple sensor pads, a sensor using lenses of different aperture sensors, a radar or ultrasonic sensor, or a thermopile or quantum photodiode sensor may be used to detect directional motion.

Data generated by a single sensor may be able to detect both the presence of a person, and the direction that person is moving in. For example, the data generated by a single sensor may be used to determine whether a person is entering or exiting a room of a structure. The directional motion detected using data from the single sensor may be, for example, movement across the field of view of the sensor, and movement towards or away from the location of the single sensor. The structure may be, for example, a home, office, apartment, condo, or other structure, and may include a combination of enclosed and open spaces. The structure may be a smart home environment, which may include, for example, a hub computing device. The hub computing device may be suitable computing device for managing sensors and other systems, such as automation systems, within the structure. The hub computing device may be a controller for a smart home environment. For example, the hub computing device may be or include a smart thermostat. The hub computing device also may be another device within the smart home environment or may be a separate computing device dedicated to managing the smart home environment. The hub computing device may be connected, through any suitable wired and wireless connections, to a number of sensors and controllable devices distributed throughout the structure. For example, the hub computing device, sensors, and other components of the smart home environment may be connected in a mesh network. Some of the sensors may, for example, be motions sensors, including passive infrared sensors used for motion detection, light sensors, cameras, microphones, entryway sensors, smart light switches, as well as mobile device scanners that may use Bluetooth, WiFi, RFID, or other wireless devices as sensors to detect the presence of devices such as smartphones, tablets, laptops, or fobs. Sensors may be distributed individually or may be combined with other sensors in sensor devices. For example, a sensor device may include a low power motion sensor and a light sensor, or a microphone and a camera, or any other combination of available sensors.

Directional motion may be determined from data generated by a single sensor using a machine learning system. The machine learning system may be any suitable machine learning system for determining directional motion from data generated by a single sensor. The machine learning system may be, for example, a Bayesian network, artificial neural network, support vector machine, or any other suitable statistical or heuristic machine learning system type. The machine learning system may be trained on data from various single sensors using supervised learning before the machine learning system is used with hub computing device in a structure. For example, a training data set may be generated by having persons move in front of single sensors and associating the data generated by the single sensors with the direction of motion of the persons. The data generated by the single sensors may be featurized in any suitable manner. The machine learning system may be trained using the training data set, for example, with data generated by a single sensor being input to the machine learning system. The output of the machine learning system may be a direction of motion that may be compared to the direction of motion associated in the training data set with the input data. The machine learning system may be adjusted based on the how well the direction of motion output by the machine learning system matches the direction of motion associated in the training data set with the input data. After training, the machine learning system may be implemented as a direction detection system in the hub computing device used to control a smart home environment in a structure.

The hub computing device may receive data generated by single sensors distributed throughout the structure. For example, a single sensor may be placed on or near each entryway to rooms within the structure, such as on a doorframe, on a wall just inside or outside of doorway. Single sensors may also be placed, for example, in hallways, such that their fields of view do not overlap. When data generated by a single sensor is received at the hub computing device, the data may be input to the machine learning system that implements the direction detection system. The direction detection system may output directional motion based on the input data generated by the single sensor. For example, the direction detection system may output the data indicate that a person has moved left to right in the field of view of the sensor, right to left in the field of view of the sensor or has not moved in either direction in the field of view of the sensor.

Various sensor types may be may be used as single sensors to detect directional motion. A single sensor used to detect directional motion may be, for example, a passive infrared (PIR) sensor with multiple sensor pads. For example, a PIR sensor may include two sensor pads which may be each be able to detect moving heat sources based on infrared radiation. The sensor pads may be configured so that a heat source detected by a first sensor pads generates a positive pulse, while a heat source detected by the second sensor pad generates a negative pulse. The sensors may be arranged next to each other within the PIR sensor, for example, with the first sensor pad on the left and the second sensor pad on the right. A heat source that moves from left to right in front of the PIR sensor may first be detected by the first sensor pad, on the left of the PIR sensor, triggering a positive pulse, and then by the second sensor pad, on the right of the PIR sensor, triggering a negative pulse. Conversely, a heat source that moves from right to left in front of the PIR sensor may first be detected by the second sensor pad, triggering a negative pulse, and then by the first sensor pad, triggering a positive pulse. The ordering of positive and negative pulses output by the sensors pads of the PIR sensor may be used to determine the directional motion of a heat source that is passing in front of the PIR sensor.

A single sensor for detection of directional motion may include a single detector and two lenses of different aperture sizes. The detector may be, for example, a photodiode, thermopile, pyroelectric, ultrasound, or radar-based sensor. The lenses may be arranged so that the signal produced by the detector is asymmetric when a detectable object, such as a heat source or object that reflects light, radar or ultrasound, moves across the front of the single sensor. For example, a first lens positioned to the left of the single sensor may have a larger aperture than a second lens positioned to the right of the single sensor. If the detector uses a thermopile to detect infrared radiation, when a heat source moves from left to right in front of the single sensor, infrared radiation from the heat source may first be focused on the thermopile by the first lens with the larger aperture, producing a large spike in the signal from the thermopile. As the heat source moves across the face of the single sensor, the infrared radiation from the heat source may be focused on the thermopile by the second lens, with the smaller aperture. This may produce a smaller spike in the signal from the thermopile. Conversely, a heat source that moves from right to left in front of the single sensor may first have its infrared radiation focused on the thermopile by the second lens, producing a smaller spike, and then the first lens, producing a larger spike. The ordering of the smaller and larger spikes output by the thermopile may be used to determine the directional motion of the heat source that is passing in front of the single sensor.

The single sensor may use more than two lenses or may use a single lens that may be off-center relative to the detector or may by asymmetrical. The single lens may also apertures or openings of different sizes instead of lenses or in combination with lenses, in order to create asymmetric signal patterns from a detector when an object moves in different directions in front of the single sensor.

A radar sensor for the detection of directional motion may include a radar with receiver and a transmitter operating at any suitable frequency to measure the doppler shift of a radar signal reflected off of an object moving in front of the sensor. The radar sensor may, for example, operate at 2.4 GHz, 3 GHz-10 GHz, 24 Ghz, or 60 GHz. A fast Fourier transform (FFT) may be performed on inphase and quadrature components of a mixed radar signal to obtain the radial velocity. The radial velocity of the object may indicate the directional motion of the object. An ultrasonic sensor operating in the 20 KHz to 200 KHz range may similarly be used. A radar or ultrasonic sensor may also be used to measure the absolute distance to an object, and the derivative of distance readings over time may be used to determine the directional motion of the object. The distance to the object may be determined with a radar sensor using impulse or time of flight measurements or frequency modulating continuous wave techniques and may be determined with an ultrasonic sensor using time of flight measurements.

A sensor with a thermopile or quantum photodiode may be used to prevent false positives. For example, a person standing directly in front of a single sensor for detecting directional motion and not moving may trigger a false positive for detected directional motion. A thermopile or quantum photodiode may be used in a single sensor to determine when a person is front of the single sensor but is not moving. The thermopile or quantum photodiode may take a DC measurement of the body heat of the person. No changes in the DC measurement may indicate that the person is not moving, and any attempt to determine a direction of motion of the person may be suspended until the DC measurement indicates that the person might be moving in a particular direction instead of standing still.

In some implementation, sensors may be paired to detect the directional motion instead of using a single sensor. For example, two PIR sensors may be placed near each other such that a heat source moving across the PIR sensors may trigger one sensor first, then trigger the other sensor. Paired sensors may use any suitable sensors, including time of flight sensors, proximity sensors such as thermopile or quantum photodiode sensors, ultrasonic sensors, infrared proximity sensors, active infrared (AIR) sensors, PIR sensors, or any other type of object detecting sensor. A pair of sensors may use sensors of the same type or different types. In some implementations, more than two sensors may be used, allowing for the creation of more complex and distinct signal signatures that may indicate the direction of a motion of an object relative to the sensors.

The directional motion of a person, as determined using data from the single sensor, may be used to control various aspects of the structure, such as the lights in the room where the single sensor is located. For example, a single sensor that detects directional motion may be placed at the entryway to a room. Data generated by the single sensor, for example, singles produced by sensor pads of a PIR sensor, may be transmitted to the hub computing device that controls the structure. The data may be input to the direction detection system, which may run on the hub computing device or another computing device in the structure, or may run remotely, for example, on a remote server system to which the hub computing device is connected. The direction detection system may have been trained to determine directional motion using data generated by a sensor similar to the single sensor at the entryway to the room. The direction detection system may output whether the data from the single sensor indicates directional motion in front of the sensor either from left to right or right to left, or no motion. The output of the direction detection system may be used by the hub computing device to control devices in the room. For example, if the single sensor is positioned so that left to right past the single sensor results in entering the room, and right to left motion results in leaving the room, the hub computing device may turn on lights in the room when the direction detection system outputs that left to right motion was detected and turn off the light in the room when the direction detection system outputs that right to left motion was detected. The hub computing device may do nothing if the direction detections system indicates that no motion was detected.

Patterns of directional motion may be used to map the substructures, such as hallways, of a structure. Patterns of directional motion, or motion patterns, may be based on routes or types of motion that are frequently detected within the structure based on data generated by the sensors. For example, a pattern of motion may include a route from a first room, down a hallway, and into a second room, that is frequently traveled by occupants of the structure. The patterns of motion in a structure may be constrained by the substructures of a substructure. A machine learning system may be trained using data from multiple sensors of various types to associate motion patterns with the substructures of the structure that produce the motion patterns. For example, hallways may have different motion patterns than rooms, and different types of intersections, such as T-junctions, may have their own distinct motion patterns which may be based on the physical constraints on paths that can be traveled imposed by the substructure. After training, the machine learning system may be implemented as a structural classifier system in the hub computing device used to control a smart home environment in a structure. The structural classifier system may run on the hub computing device or another computing device in the structure, or may run remotely, for example, on a remote server system to which the hub computing device is connected. The structural classifier system may receive data from the various sensors of various types placed throughout the structure and may output substructures indicated by the received data. The output substructures may be combined with data indicating the location and facing of the various sensors throughout the structure to generate a structural map of the structure, for example, indicating the location of rooms, entryways, hallways, and junctions within the structure.

Directional motion within the structure, as determined by the direction detection system, may be combined with other data, such as the time of day, to determine motion patterns for a structure. A machine learning system may use directional motion data, either as determined by the direction detection system or as data generated by sensors in the structure, and context data, such as the time of day, day of the week, geo-location data, and any other suitable data about a structure and the current context, to determine patterns of motion for the structure. The machine learning system may be, for example, an unsupervised machine learning system that may be trained online within the structure, for example, running on the hub computing device or another computing device in the structure or running remotely, for example, on a remote server system to which the hub computing device is connected. Directional motion as determined by the direction detection system from the data generated by sensors in the structure may be input to the machine learning system or the data generated by the sensors may be input directly to the machine learning model. The learned patterns of motion may include both the motion of occupants of the structure and the context in which those motions occur. For example, a pattern of motion may be learned by the machine learning system when an occupant is detected entering a specific room of the structure at a specific time of day on specific days of the week over a number of weeks. After training, the machine learning system may be implemented as a motion pattern system in the hub computing device used to control a smart home environment in a structure.

Directional motion within the structure, as determined by the direction detection system, or the data generated by the sensors within the structure, may be input to the motion pattern system along with the time of day, day of week, location data for the structure, and any other suitable data about the structure or the current context. The motion pattern system may output, for example, whether the input directional motion is anomalous based on the time of day, day of week, location data, and other data about the structure and current context. For example, the data used to train the motion pattern system may indicate that directional motion is detected by a single sensor in the kitchen on Tuesday mornings between 9:00 am and 9:30 am. Input to the motion pattern system with a time of day of 9:15 am, a day of week Tuesday, and data generated by the single sensor in the kitchen that shows no motion has been detected may result in the motion pattern system outputting that the lack of directional motion detected in the kitchen is anomalous.

The motion pattern system may be used to generate localized intruder alerts. For example, the motion pattern system may determine, from input of directional motion, the time of day, day of week, location data, and other data about the structure and current context, that the input directional motion is anomalous. The directional motion may indicate that the motion of a person has been detected. The motion pattern system may output an intruder alert, and the directional motion data may be used to determine, for example, the location of the sensors whose data was used to determine the directional motion of the intruder, the direction in which the intruder was detected to be moving, and the speed at which the intruder is moving. This data related to the intruder may be transmitted to appropriate device by the hub computing device. For example, the hub computing device may transmit the data related to the intruder to a smartphone that is known to be owned by an occupant of the structure, or to any other audio or video device which may be used by occupants of the structure.

The motion pattern system may be used for automated control of devices within a structure. For example, the motion pattern system may output detected patterns of motion based on input including directional motion within the structure, as determined by the direction detection system, or the data generated by the sensors within the structure, the time of day, day of week, location data for the structure, and any other suitable data about the structure or the current context. During training, the motion pattern system may associate different patterns of motion with different actions taken by persons within the structure. For example, a person who enters a particular room in the evening on Thursdays may always turn on desk light for a desk in the room. The desk light may be a smart device that may be connected to the hub computing device. The motion pattern system may, during training, associate the detected directional motion of the person in the room in the evening on Thursdays with the turning on of the desk light in the room. The motion pattern system may automate the action of turning on the desk light. For example, when the motion pattern system receives as input data indicating directional motion that indicates that the person is moving across the room, a time of day indicating that it is the evening, and a day of week of Thursday, the motion pattern system may output a control signal that may cause the hub computing device to turn on the desk light in the room. The motion pattern system may associate any number of actions with any patterns of motion, allowing for automation of devices in the structure based directional movement detected within the structure and the context, including time of day and day of week, in which the directional movement is detected. The motion pattern system may also associate actions that were not performed during the training of the motion pattern system with patterns of motion. For example, the motion pattern system may automate the activation of lights in a hallway as a person is detected to be walking down the hallway by the motion pattern system at night. The motion pattern system may, for example, output an indication that a person has been detected walking down a particular hallway and that a light in that hallway should be turned on in advance of the person's arrival at that light.

Sensors used to detect presence and directional motion may be used to count the number of people that have entered or exited a room in order to maintain a count of the number of people in a room. A single sensor positioned at the entryway to a room may include a microcontroller or other computing component which may analyze data generated by the detector of the single sensor. The microcontroller may maintain a count of people in the room. The count may be start at zero after the single sensor is installed in the entryway and the room is empty. When data generated by the detector of the single sensor, which may be, for example, a PIR sensor with two sensor pads, indicates the detection of a person with directional motion into the room, the microcontroller may increase its count by one. When data generated by the detector of the single sensor indicates detection of a person with directional motion out of the room, the microcontroller may decrease its count by one. For example, a single sensor may be positioned in an entryway such that crossing from left to right in the field of view of the single sensor results in entering the room, while crossing from right to left results in leaving the room. The count kept by the microcontroller on the single sensor may be transmitted to the hub computing device. The hub computing device may use counts in any suitable manner. For example, the hub computing device may use the count from a single sensor for a room when determining whether to turn off the lights for that room. This may prevent lights controlled by the hub computing device from being turned off while a room is occupied when the occupants of the room have not been moving in a way that would prevents lights controlled by a motion sensor from being turned off. If a room has more than one entryway, each with its own single sensor, the counts for the single sensors for each entryway may be combined by the hub computing device to determine the occupancy of the room. The microcontroller may be able to keep a negative count, for example, when a person enters a room through one entryway and exits the room through a different entryway.

FIG. 1 shows an example system suitable for presence and directional motion detection according to an implementation of the disclosed subject matter. A hub computing device 100 may include a signal receiver 110, a direction detector 120, a structural classifier 130, a motion pattern detector 150, an occupancy counter 160, a controller 170, and storage 140. The hub computing device 100 may be any suitable device, such as, for example, a computer 20 as described in FIG. 23, for implementing the signal receiver 110, the direction detector 120, the structural classifier 130, the motion pattern detector 150, the occupancy counter 160, the controller 170, and the storage 140. The hub computing device 100 may be, for example, a controller 73 as described in FIG. 21. The hub computing device 100 may be a single computing device, or may include multiple connected computing devices, and may be, for example, a smart thermostat, other smart sensor, smartphone, tablet, laptop, desktop, smart television, smart watch, or other computing device that may act as a hub for a smart home environment in a structure, which may include a security system and automation functions. The smart home environment may be controlled from the hub computing device 100. The hub computing device 100 may also include a display. The signal receiver 110 may be any suitable combination of hardware or software for receiving signals generated by sensors that may be part of the smart home environment and may be connected to the hub computing device 100. The direction detector 120 may be any suitable combination of hardware and software for determining the directional motion of a person from signals generated by sensors of the smart home environment. The structural classifier 130 may be any suitable hardware and software for determining the various substructures within the structure of the smart home environment based on signals generated by sensors of the smart home environment. The motion pattern detector 150 may be any suitable combination of hardware and software for detecting patterns of motion within the structure of the smart home environment based on signals generated by sensors of the smart home environment and other contextual data. The occupancy counter 160 may be any suitable combination of hardware and software for keeping track of the occupancy count of the rooms in the structure of the smart home environment based on signals generated by the sensors of the rooms of the smart home environment. The controller 170 may be any suitable combination of hardware and software for controlling devices of the smart home environment. The storage 140 may be any suitable combination of hardware and software for implementing non-volatile storage, which may store, for example, weights and models for various machine learning systems.

The hub computing device 100 may be any suitable computing device for acting as the hub of a smart home environment. For example, the hub computing device 100 may be a smart thermostat, which may be connected to various sensors throughout an environment as well as to various systems within the environment, such as HVAC systems, or it may be another device within the smart home environment. The hub computing device 100 may include any suitable hardware and software interfaces through which a user may interact with the hub computing device 100. For example, the hub computing device 100 may include a touchscreen display, or may include web-based or app based interface that can be accessed using another computing device, such as a smartphone, tablet, or laptop. The hub computing device 100 may be located within the same environment as the smart home environment it controls or may be located offsite. An onsite hub computing device 100 may use computation resources from other computing devices throughout the environment or connected remotely, such as, for example, as part of a cloud computing platform. The hub computing device 100 may be used to arm a security system of the smart home environment, using, for example, an interface on the hub computing device 100. The security system may be interacted with by a user in any suitable matter, including through a touch interface or voice interface, and through entry of a PIN, password, or pressing of an "arm" button on the hub computing device 100.

The hub computing device 100 may include a signal receiver 110. The signal receiver 110 may be any suitable combination of hardware and software for receiving signals from sensors connected to the hub computing device 100. For example, the signal receiver 110 may receive signals from any sensors distributed throughout a smart home environment, either individually or as part of sensor devices. The signal receiver 110 may receive any suitable signals from the sensors, including, for example, audio and video signals, signals indicating light levels, signals indicating detection or non-detection of motion, signals whether entryways are open, closed, opening, closing, or experiencing any other form of displacement, signals indicating the current climate conditions within and outside of the environment, smoke and carbon monoxide detection signals, and signals indicating the presence or absence of occupants in the environment based on Bluetooth or WiFi signals and connections from electronic devices associated with occupants or fobs carried by occupants. The signal receiver 110 may pass received signals to other components of the hub computing device 100 for further processing, such as, for example, detection of tripped motion and entryway sensors and use in automation and security determinations, and for storage. The signal receiver 110 may also be able to receive, or to associate with a received signal, an identification for the sensor from which the signal was received. This may allow the signal receiver 110 to distinguish which signals are being received from which sensors throughout the smart home environment. The signal receiver 110 may filter signals based on type of sensor that generated the signal.

The hub computing device 100 may include a direction detector 120. The direction detector 120 may be any suitable combination of hardware and software for determining the directional motion of a person from signals generated by sensors of the smart home environment. The direction detector 120 may, for example, use any suitable machine learning system to generate an indication of the direction a person is moving relative to a sensor based on data generated by the sensor. The indication may be, for example, that the person is moving from right to left, left to right, or that no directional motion is detected due to no person being in the field of view of the sensor or due to a person standing still in front of the sensor.

The hub computing device may include a structural classifier 130. The structural classifier 130 may be any suitable hardware and software for determining the various substructures within the structure of the smart home environment based on signals generated by sensors of the smart home environment. The structural classifier 130 may, for example, use any suitable machine learning system to generate identifications of the substructures of the structure of the smart home environment, for example, identifying rooms, hallways, and junctions, based on directional motion indicated by sensors at known locations in the structure. The structural classifier 130 may be trained, for example, using associations between patterns of movements indicated by a data from a sensor and the type of substructure that may result in those patterns of movement.

The hub computing device 100 may include a motion pattern detector 150. The motion pattern detector 150 may be any suitable combination of hardware and software for detecting patterns of motion within the structure of the smart home environment based on signals generated by sensors of the smart home environment and other contextual data. The motion pattern detector 150 may, for example, use any suitable machine learning system to learn the patterns of motion that occur within a structure in various contexts using online unsupervised learning, and may generate output indicating divergences from the learned patterns of motion within the structure. The motion pattern detector 150 may be able to, for example, provide intruder alerts based on directional motion detected using data from sensors that diverges from learned patterns of motion for the structure.

The hub computing device 100 may include an occupancy counter 160. The occupancy counter 160 may be any suitable combination of hardware and software for keeping track of the occupancy count of the rooms in the structure of the smart home environment based on signals generated by the sensors of the rooms of the smart home environment. The occupancy counter 160 may, for example, keep a count of occupants in the rooms of a structure based on counts received from microcontrollers of the sensors in the structure, which may be based on directional motion detected by the sensors. The occupancy counter 160 may collate counts from sensors that monitor different entryways to the same room in order to obtain a count of the occupancy of the room.

The hub computing device 100 may include a controller 170. The controller 170 may be any suitable combination of hardware and software for controlling devices of the smart home environment. The controller 170 may, for example, be able to send control signals to sensors, light switches, remote controlled locks, audio and visual devices, and any other controllable devices that may be connected to the hub computing device. For example, the controller 170 ay be able to turn lights on and off in respond to instructions from other components of the hub computing device 100, such as the direction detector 120, the motion pattern detector 150, and the occupancy counter 160.

The storage 140 may be any suitable storage hardware connected to the hub computing device 100. For example, the storage 140 may be a component of the hub computing device, such as a flash memory module or solid state disk, or may be connected to the hub computing device 100 through any suitable wired or wireless connection. It may be a local storage, i.e., within the environment within which the hub computing device 100 operates, or it may be partially or entirely operated by a remote service, such as a cloud-based monitoring service as described in further detail herein. The storage 140 may store weights, models, or other data structures used by the machine learning systems of the direction detector 120, the structural classifier 130, and the motion pattern detector 150.

Figure 2:
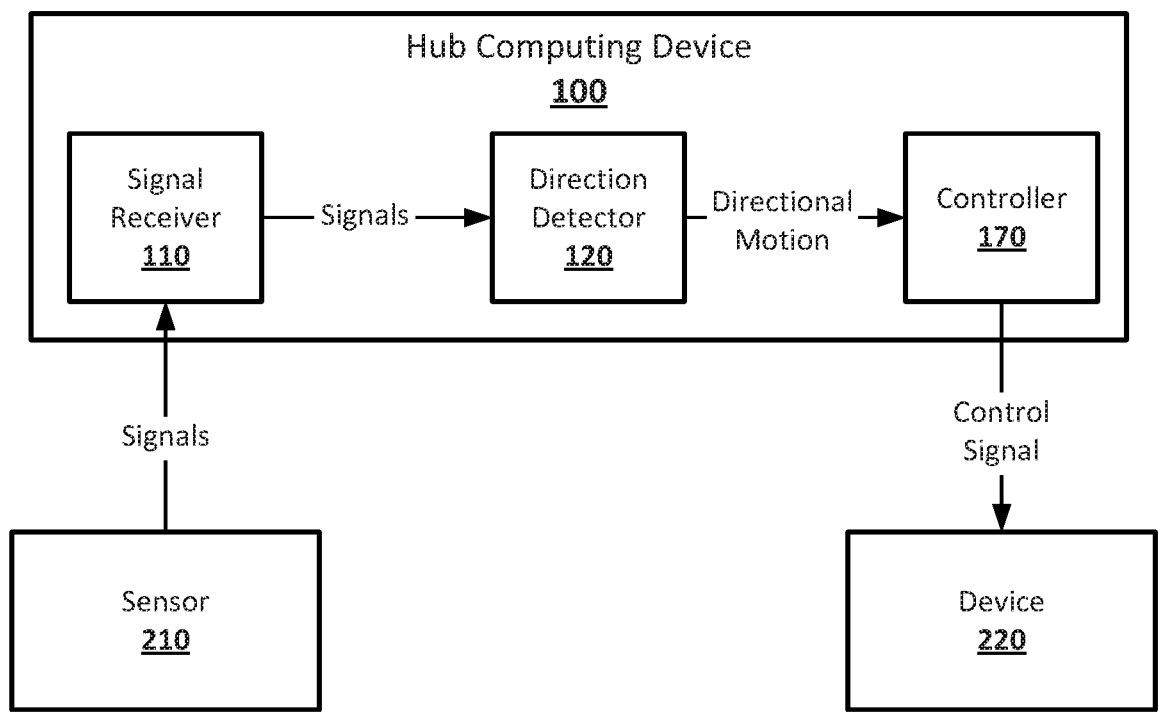
FIG. 2 shows an example arrangement suitable for presence and directional motion detection according to an implementation of the disclosed subject matter.

FIG. 2 shows an example arrangement suitable for presence and directional motion detection according to an implementation of the disclosed subject matter. The signal receiver 110 may receive signals from a sensor 210 in the structure of the smart home environment. The signals may include, for example, signals and other data generated by the sensor 210 based on observations made by the detector of the sensor 210. The direction detector 120 may receive the signals from the signal receiver 110. The direction detector 120 may generate an indication of directional motion based on the signals from the sensor 210. The indication of directional motion may indicate, for example, that motion from left to right in front of the sensor 210 was detected, that motion from right to left in front of the sensor 210 was detected, or that no motion in front of the sensor 210 was detected.

The controller 170 may receive the indication of directional motion from the direction detector 120. The controller 170 may generate a control signal that may be transmitted to a device 220. The device 220 may be any suitable controllable device in the structure connected to the hub computing device 100, such as, for example, a light switch. The control signal may be transmitted over any suitable wired or wireless connection between the hub computing device 100 and the device 220, including, for example, through a mesh wireless connection which relays the control signal through other devices. The control signal may be based on the indication of directional motion, the location of the device 220, and any rules for control of the device 220. For example, device 220 may a be light switch in a room whose entryway is monitored by the sensor 210. An indication of directional motion from left to right in front of the sensor 210, which may be from outside the room into the room, may result in a control signal to the device 220 that turns on the light switch. The controller 170 may generate multiple control signals for multiple devices based on a single indication of directional motion. For example, directional motion from right to left in front of the sensor 210 may be from inside a room to a hallway outside the room. The controller 170 may send a control signal to the device 220 which may turn off the light switch and may send another control signal to a light switch for a light in the hallway outside the room, turning on the light switch.

Figure 3:
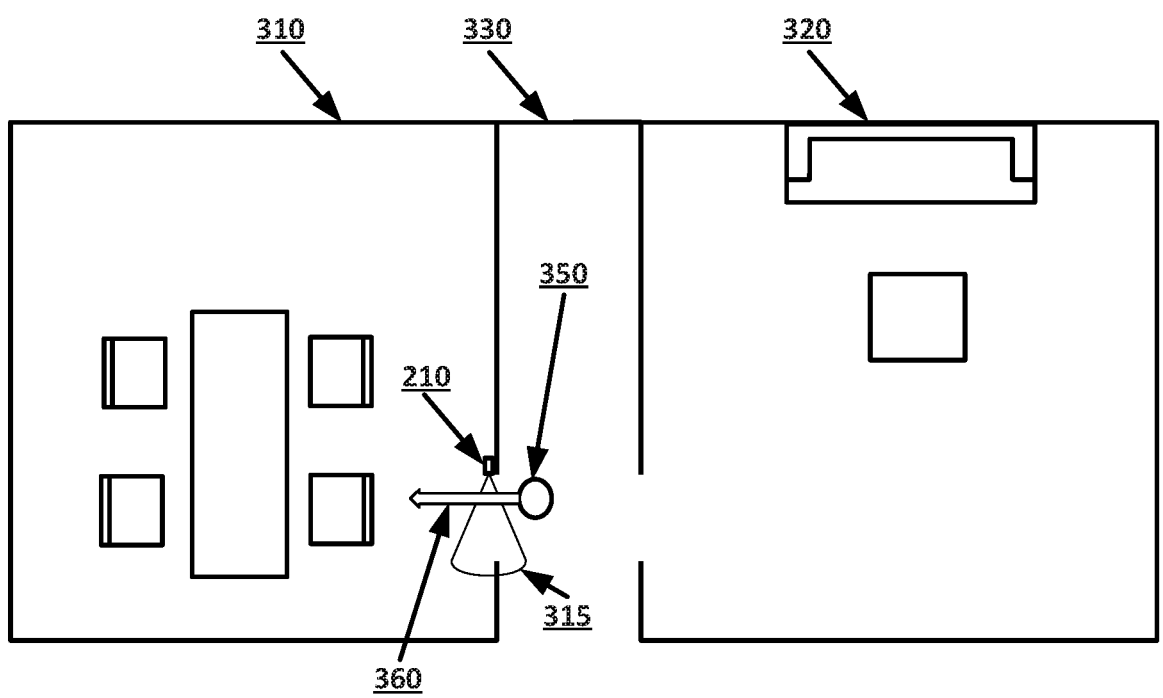
FIG. 3 shows an example environment suitable for presence and directional motion detection according to an implementation of the disclosed subject matter.

FIG. 3 shows an example environment suitable for presence and directional motion detection according to an implementation of the disclosed subject matter. A room 310 may be adjoined to a hallway 330 through an entryway, which may be open, or may include a door. A room 320 may be on the other side of the hallway 330 from the room 310. The sensor 210 may be may be located near the entryway to the room 310 such that the sensor 210 may monitor the entryway to the room 310. The sensor 210 may have a field of view 315.

A person 350 may move from the hallway 330 into the room 310 along a path 360. The movement may cause the person to cross the field of view 315 of the sensor 210 from left to right from the point of view of the sensor 210. Signals sent from the sensor 210 to the hub computing device may be input to the direction detector 120 which may determine there was directional movement of the person 350 from left to right in front of the sensor 210. The directional motion indication may be sent to the controller 170, which may determine that the person 350 has entered the room 310 and may control a device, such as the device 220, in accordance with the entrance of the person 350 into the room 310, for example, turning on a light switch in the room 310.

Figure 4A:
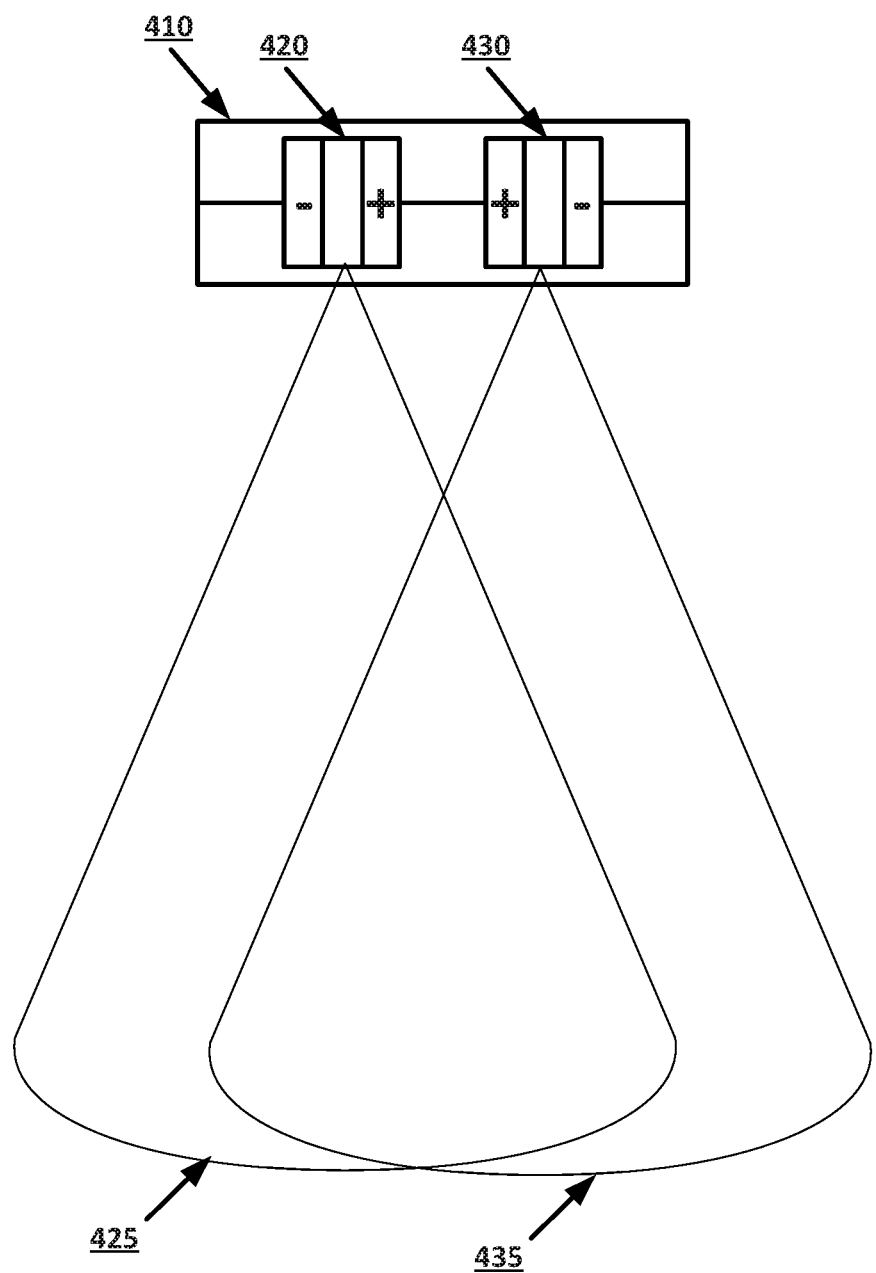
FIG. 4A shows an example arrangement suitable for presence and directional motion detection according to an implementation of the disclosed subject matter.

FIG. 4A shows an example arrangement suitable for presence and directional motion detection according to an implementation of the disclosed subject matter. The sensor 210 may be any suitable sensor for detecting motion. For example, the sensor 210 may be a PIR sensor 410 that includes two sensor pads, a right sensor pad 420 and a left sensor pad 430. The right sensor pad 420 and a left sensor pad 430 may be arranged in the PIR sensor 410 so that their polarities are opposite each other, causing them to produce signals of the opposite sign when they are activated through detected motion of a heat source. The right sensor pad 420 may have a field of view 425, and the left sensor pad may have a field of view 435. The field of view 425 and the field of view 435 may overlap.

Figure 4B:
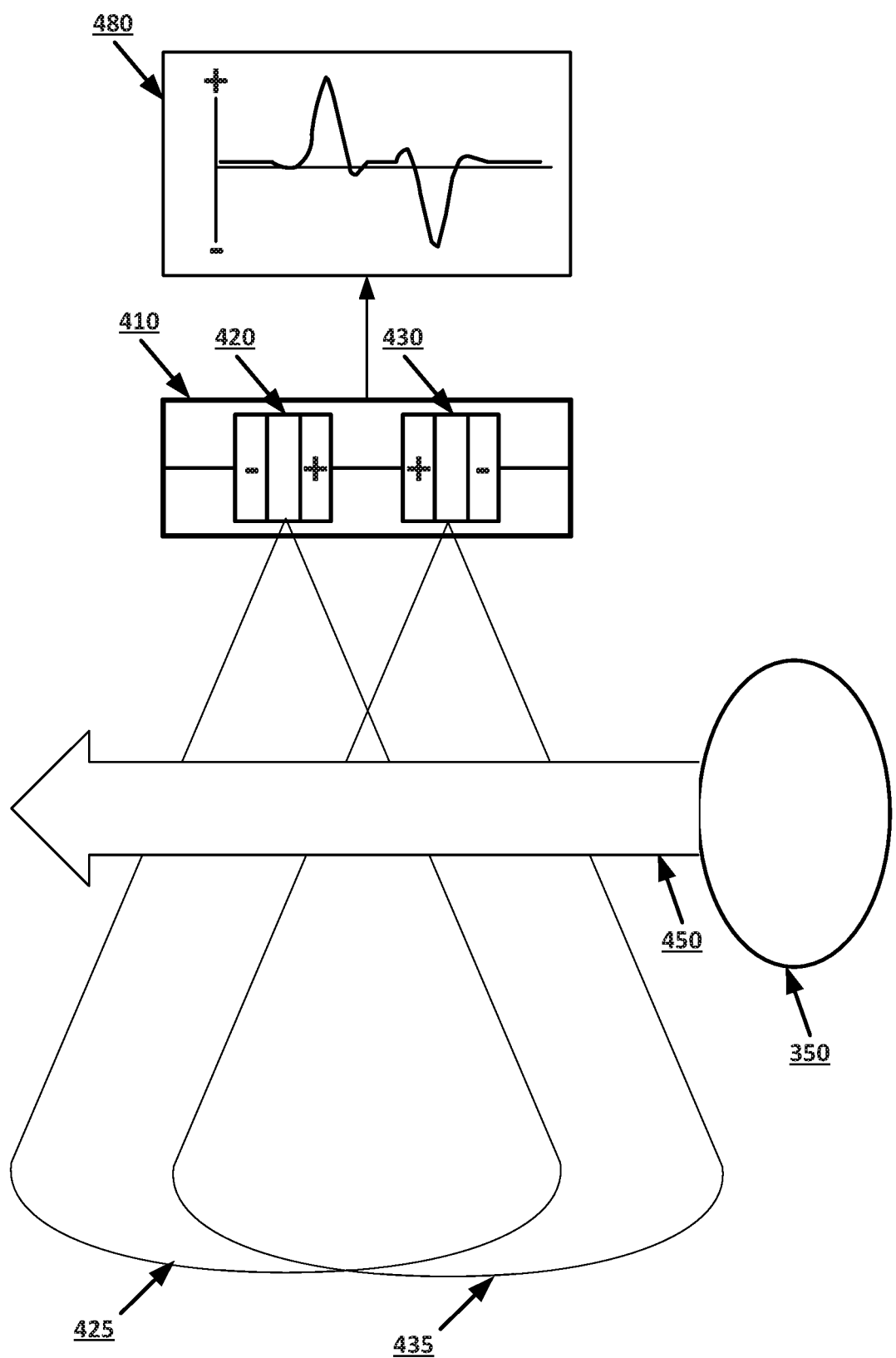
FIG. 4B shows an example arrangement suitable for presence and directional motion detection according to an implementation of the disclosed subject matter.

FIG. 4B shows an example arrangement suitable for presence and directional motion detection according to an implementation of the disclosed subject matter. The person 350 may move on a path 450 across the front of the sensor 410. The person 350 may first enter the field of view 435 of the left sensor pad 430, and then pass through the field of view 425 of the right sensor pad 420. The sensor 410 may produce a signal 480. The signal 480 may include a first, positive, pulse generated by the left sensor pad 430 when the person 350 passes through the field of view 435 as the heat from the person 350 activates the left sensor pad 430. The signal 480 may include a second, negative, pulse generated by the right sensor pad 420 when the person 350 passes through the field of view 425 after passing through the field of view 435 as the heat from the person 350 activates the right sensor pad 420. The direction detector 120 may be able to determine from the signal 480 that the person 350 moved from left to right in front of the sensor 410 from the point of view of the sensor 410, activating the left sensor pad 430 before activating the right sensor pad 420.

Figure 4C:
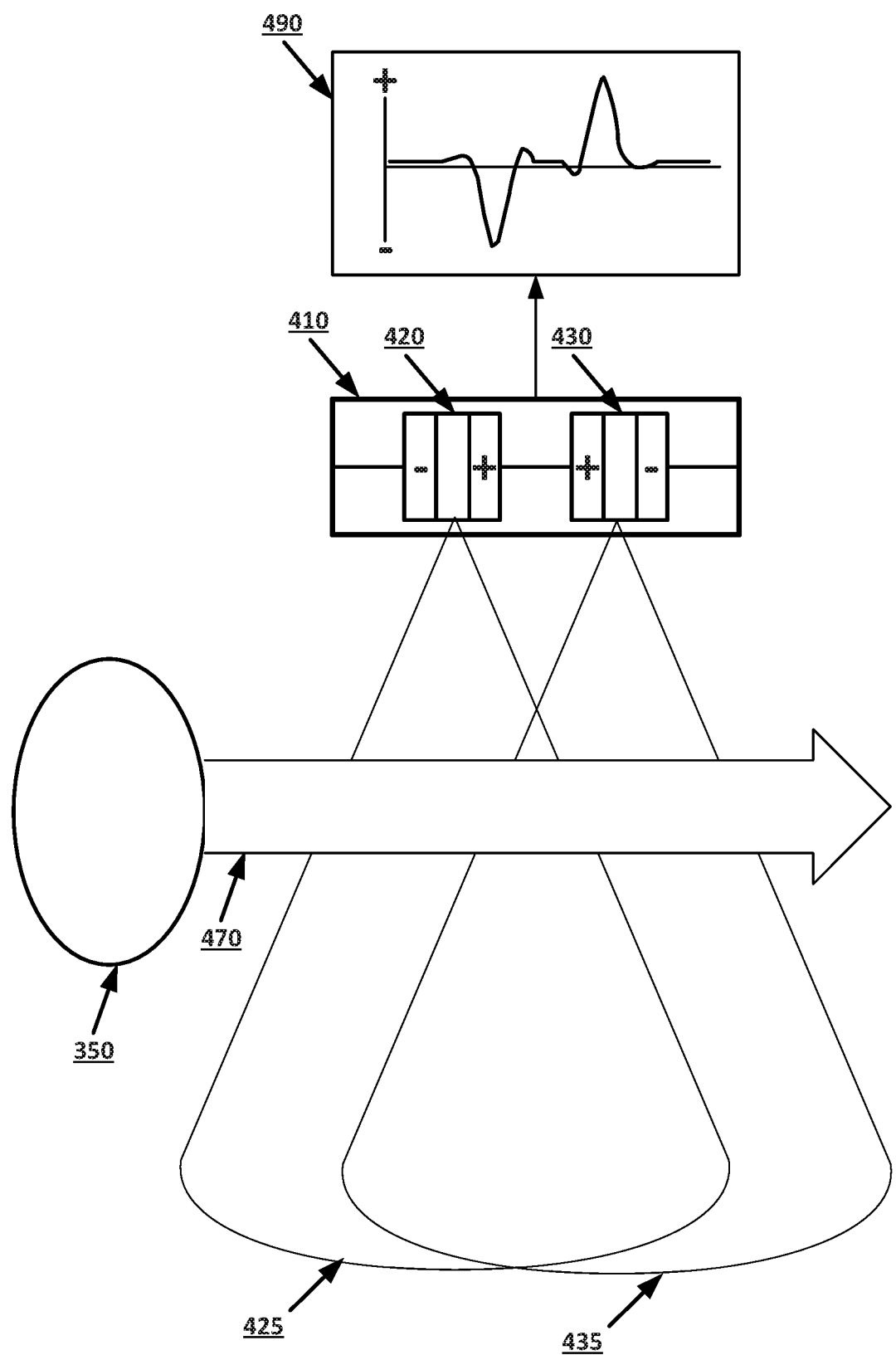
FIG. 4C shows an example arrangement suitable for presence and directional motion detection according to an implementation of the disclosed subject matter.

FIG. 4C shows an example arrangement suitable for presence and directional motion detection according to an implementation of the disclosed subject matter. The person 350 may move on a path 470 across the front of the sensor 410. The person 350 may first enter the field of view 425 of the right sensor pad 420, and then pass through the field of view 435 of the left sensor pad 420. The sensor 410 may produce a signal 490. The signal 490 may include a first, negative, pulse generated by the right sensor pad 420 when the person 350 passes through the field of view 425 as the heat from the person 350 activates the right sensor pad 420. The signal 490 may include a second, positive, pulse generated by the left sensor pad 430 when the person 350 passes through the field of view 435 after passing through the field of view 425 as the heat from the person 350 activates the left sensor pad 430. The direction detector 120 may be able to determine from the signal 490 that the person 350 moved from right to left in front of the sensor 410 from the point of view of the sensor 410, activating the right sensor pad 420 before activating the left sensor pad 430.

Figure 5A:
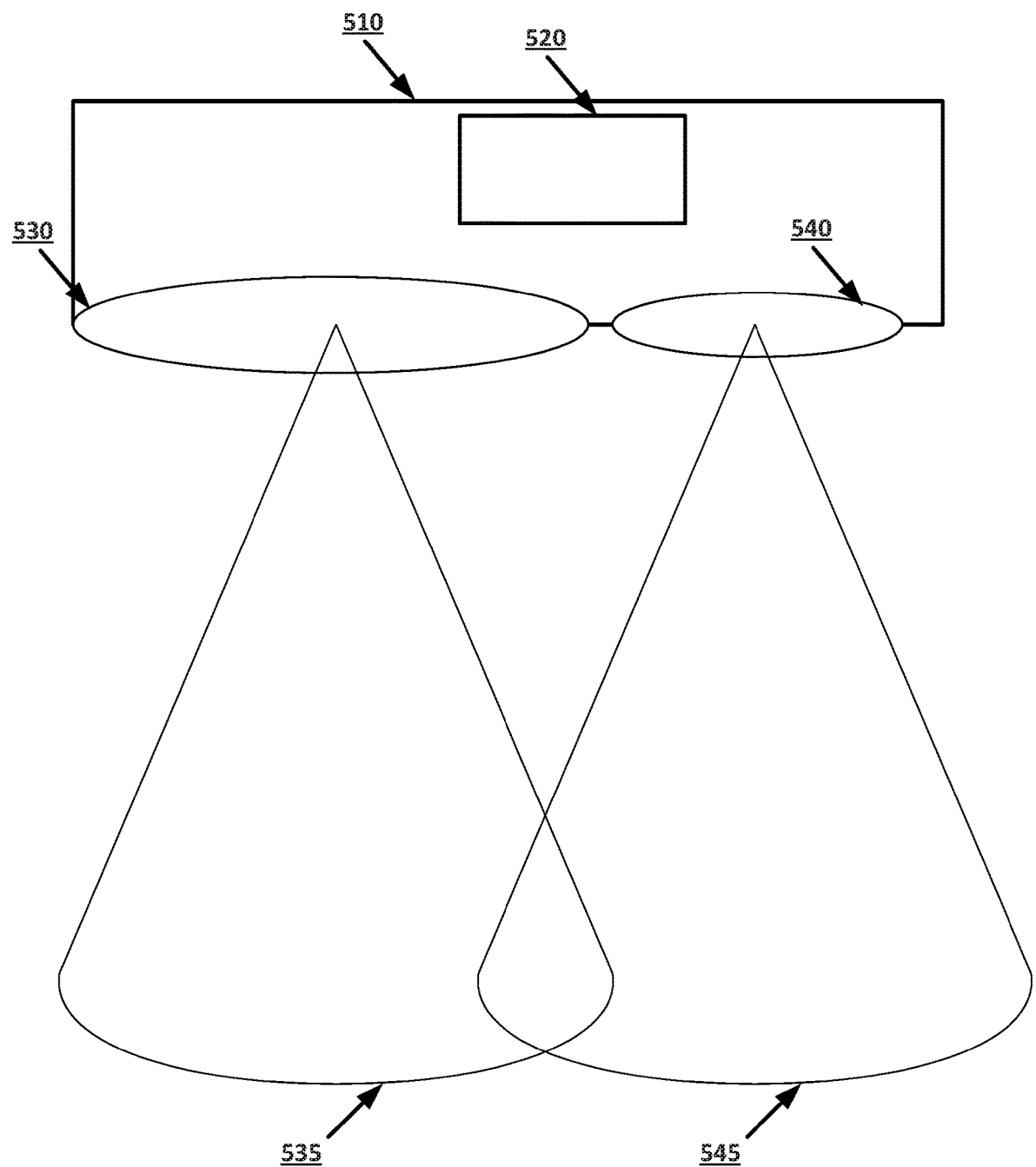
FIG. 5A shows an example arrangement suitable for presence and directional motion detection according to an implementation of the disclosed subject matter.

FIG. 5A shows an example arrangement suitable for presence and directional motion detection according to an implementation of the disclosed subject matter. The sensor 210 may be any suitable sensor for detecting motion. For example, the sensor 210 may be an asymmetric lens sensor 510 that may include two asymmetric lenses. A large lens 530 may, for example, be on the right side of the asymmetric lens sensor 510, and a small lens 540 may be on the left side of the asymmetric lens sensor 510. The asymmetric lens sensor 510 may include a detector 520, which may be a photoelectric detector, thermopile detector, ultrasound emitter/detector, or radar emitter/detector. The large lens 530 and the small lens 540 may both focus radiation, for example, light, infrared radiation, ultrasound, or radar, on the detector 520, such that the detector 520 may produce a larger signal spike when receiving radiation focused through the large lens 530 than through the small lends 540. The large lens 530 may have a field of view 535, and the small lens 540 may have a field of view 545. The field of view 535 and the field of view 545 may overlap. In some implementations, asymmetric apertures may be used instead of or in combination with lenses, and more than two apertures or lenses may be used.

Figure 5B:
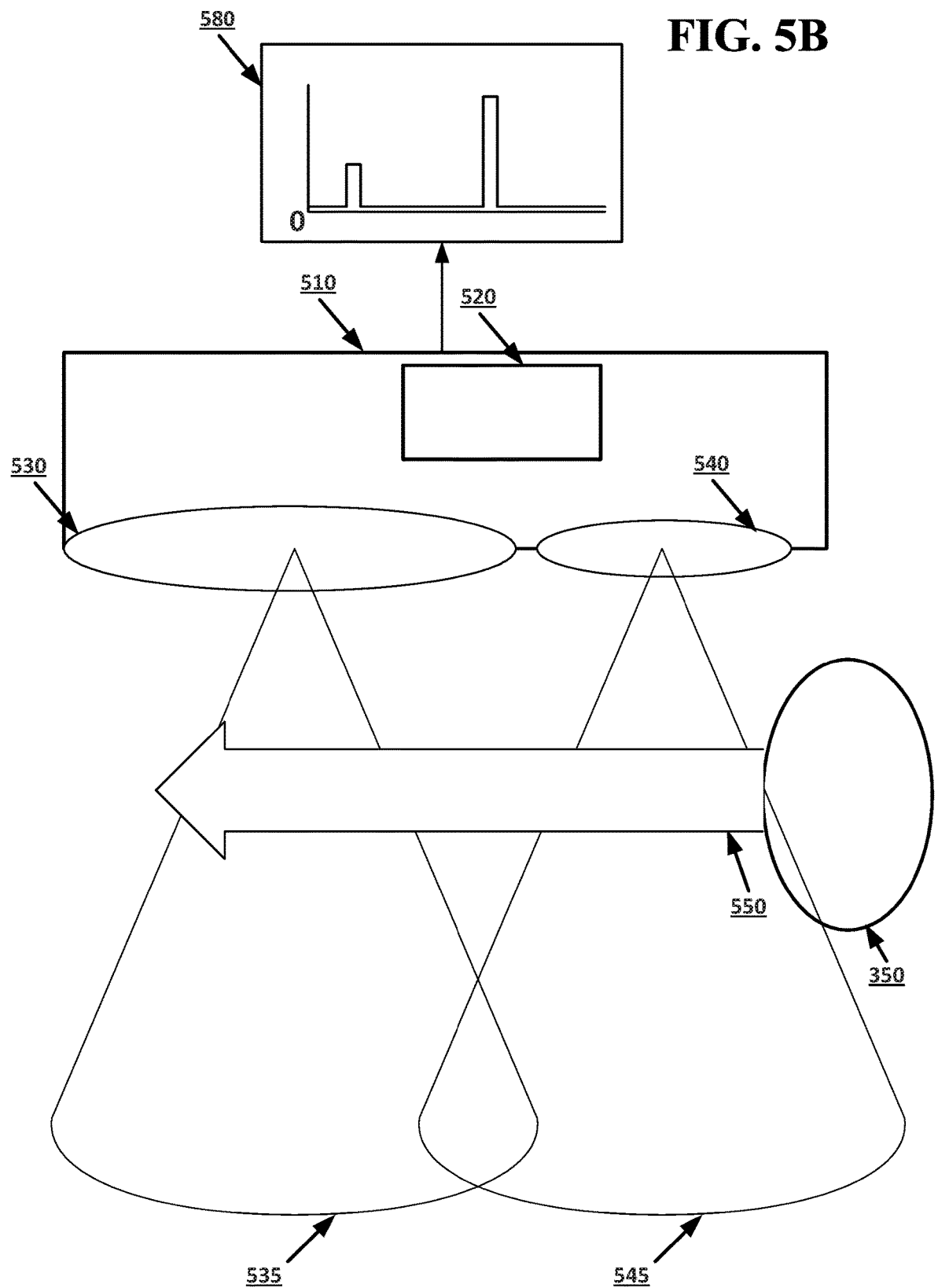
FIG. 5B shows an example arrangement suitable for presence and directional motion detection according to an implementation of the disclosed subject matter.

FIG. 5B shows an example arrangement suitable for presence and directional motion detection according to an implementation of the disclosed subject matter. The person 350 may move on a path 550 across the front of the sensor 510. The person 350 may first enter the field of view 545 of the small lens 540, and then pass through the field of view 535 of the large lens 530. The sensor 510 may produce a signal 580. The signal 580 may include a first, small, pulse generated by the detector 520 when the person 350 passes through the field of view 545 as radiation from or reflecting off the person 350 is focused through the small lens 540 onto the detector 520. The signal 580 may include a second, large, pulse generated by the detector 520 when the person 350 passes through the field of view 535 after passing through the field of view 545 as radiation from or reflecting off the person 350 is focused through the large lens 530 onto the detector 520. The large lens 520 may allow a greater amount of radiation to pass through to the detector 520 than the small lens 540, thus producing a larger spike in the signal 580. The direction detector 120 may be able to determine from the signal 580 that the person 350 moved from left to right in front of the sensor 510 from the point of view of the sensor 510, with radiation from the person 350 first focused on the detector 520 by the small lens 540 and then by the large lens 530.

Figure 5C:
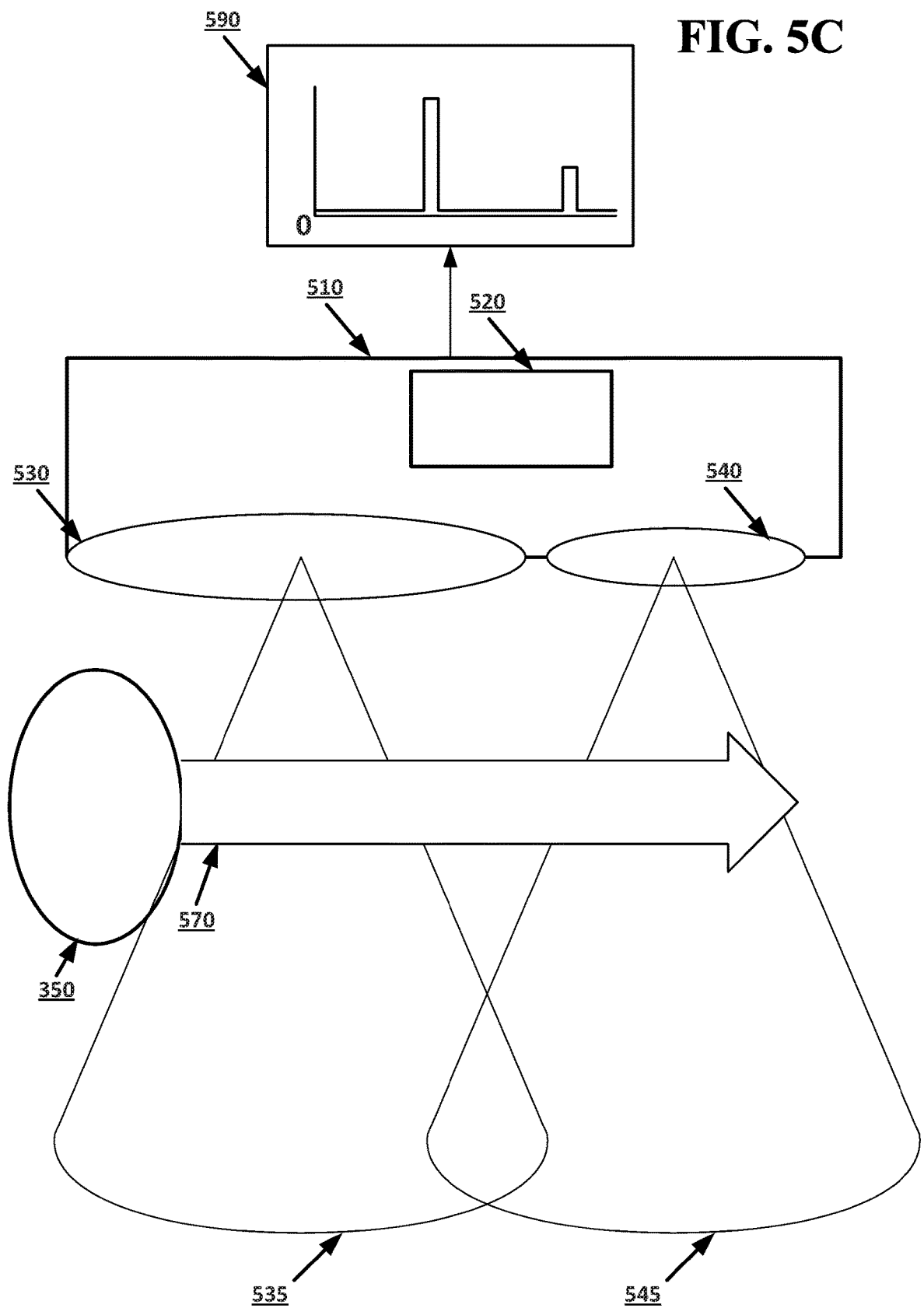
FIG. 5C shows an example arrangement suitable for presence and directional motion detection according to an implementation of the disclosed subject matter.

FIG. 5C shows an example arrangement suitable for presence and directional motion detection according to an implementation of the disclosed subject matter. The person 350 may move on a path 570 across the front of the sensor 510. The person 350 may first enter the field of view 535 of the large lens 530, and then pass through the field of view 545 of the small lens 540. The sensor 510 may produce a signal 590. The signal 590 may include a first, large, pulse generated by the detector 520 when the person 350 passes through the field of view 535 as radiation from or reflecting off the person 350 is focused through the large lens 530 onto the detector 520. The signal 580 may include a second, small, pulse generated by the detector 520 when the person 350 passes through the field of view 545 after passing through the field of view 535 as radiation from or reflecting off the person 350 is focused through the small lens 540 onto the detector 520. The large lens 520 may allow a greater amount of radiation to pass through to the detector 520 than the small lens 540, thus producing a larger spike in the signal 580. The direction detector 120 may be able to determine from the signal 580 that the person 350 moved from right to left in front of the sensor 510 from the point of view of the sensor 510, with radiation from the person 350 first focused on the detector 520 by the large lens 530 and then by the small lens 540.

Figure 6:
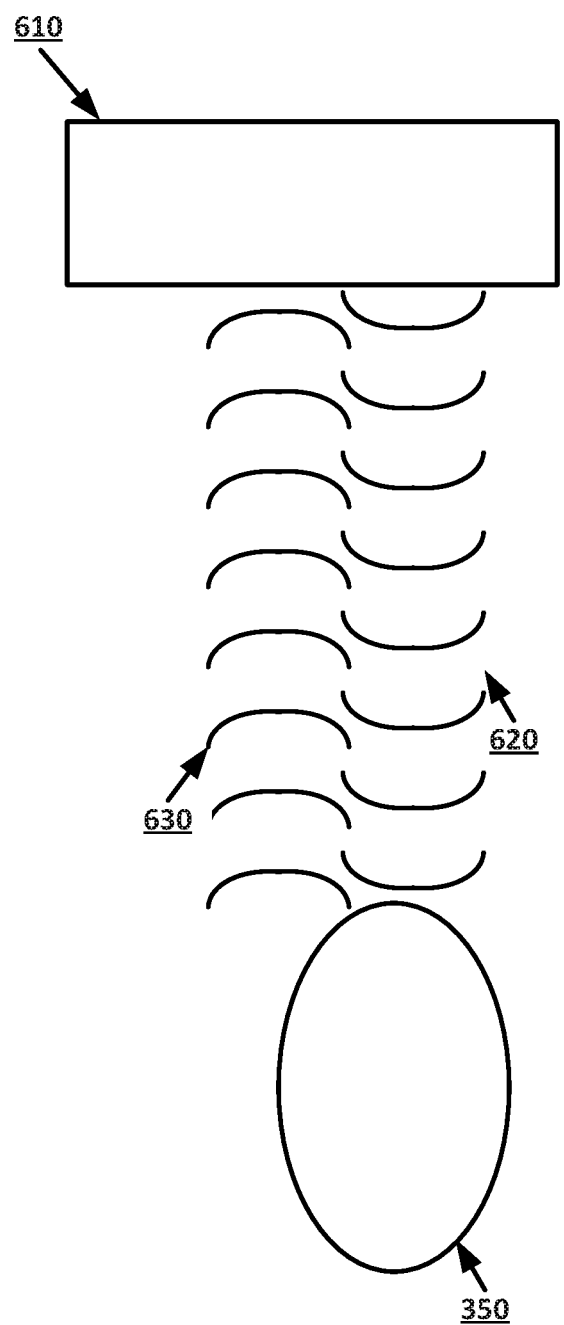
FIG. 6 shows an example arrangement suitable for presence and directional motion detection according to an implementation of the disclosed subject matter.

FIG. 6 shows an example arrangement suitable for presence and directional motion detection according to an implementation of the disclosed subject matter. The sensor 210 may be any suitable sensor for detecting motion. For example, the sensor 210 may be an emitter sensor 610 that may emit ultrasonic waves or radar waves at any suitable frequency and may include a detector for the type of emitted wave. The emitted waves 620 may reflect off objects, such as the person 350, and return as reflected waves 630 to the emitter sensor 610. The emitter sensor 610 sensor may, for example, be a radar sensor operating at 2.4 GHz, 3 GHz-10 GHz, 24 Ghz, or 60 GHz. A fast Fourier transform (FFT) may be performed on inphase and quadrature components of a mixed radar signal to obtain the radial velocity of a moving object, such as the person 350. The radial velocity of the object may indicate the directional motion of the object. The emitter sensor 610 may also be an ultrasonic sensor operating in the 20 KHz to 200 KHz. The emitter sensor 610 may also be used to measure the absolute distance to an object, and the derivative of distance readings over time may be used to determine the directional motion of the object, such as the person 350. The distance to the object may be determined with a radar sensor using impulse or time of flight measurements or frequency modulating continuous wave techniques and may be determined with an ultrasonic sensor using time of flight measurements.

In some implementations, the PIR sensor 410, asymmetric lens sensor 510, and emitter sensor 610 may include an additional thermopile or photodiode sensor. The additional photodiode or thermopile sensor may detect the body heat of a person who is standing in front of the sensor and may return a steady DC measurement of the body heat if the person is not moving. When the additional thermopile or photodiode sensor detects a person whom is not moving in front of the sensor, any directional motion determinations for the sensor may be suspended until the additional thermopile or photodiode sensor detects movement of the person.

Figure 7A:
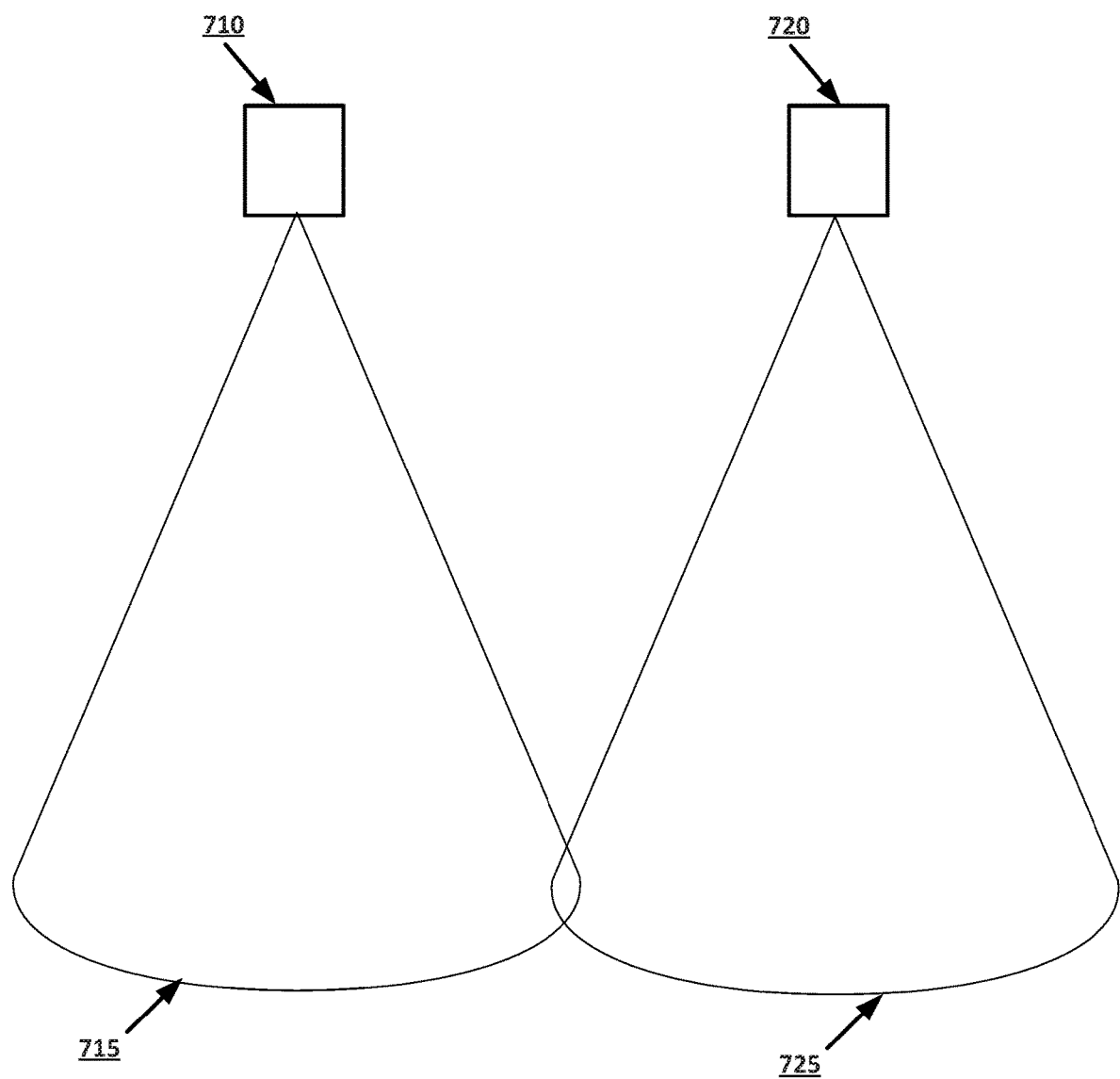
FIG. 7A shows an example arrangement suitable for presence and directional motion detection according to an implementation of the disclosed subject matter.

FIG. 7A shows an example arrangement suitable for presence and directional motion detection according to an implementation of the disclosed subject matter. Directional motion may also be detected using separate sensors 710 and 720 that may be arranged so that a person may pass in front of both sensors, for example, when entering or exiting a room. The sensors 710 and 720 may be any suitable type of sensor and may be of the same type or of different types. The sensor 710 may have a field of view 715 and the sensor 720 may have a field of view 725.

Figure 7B:
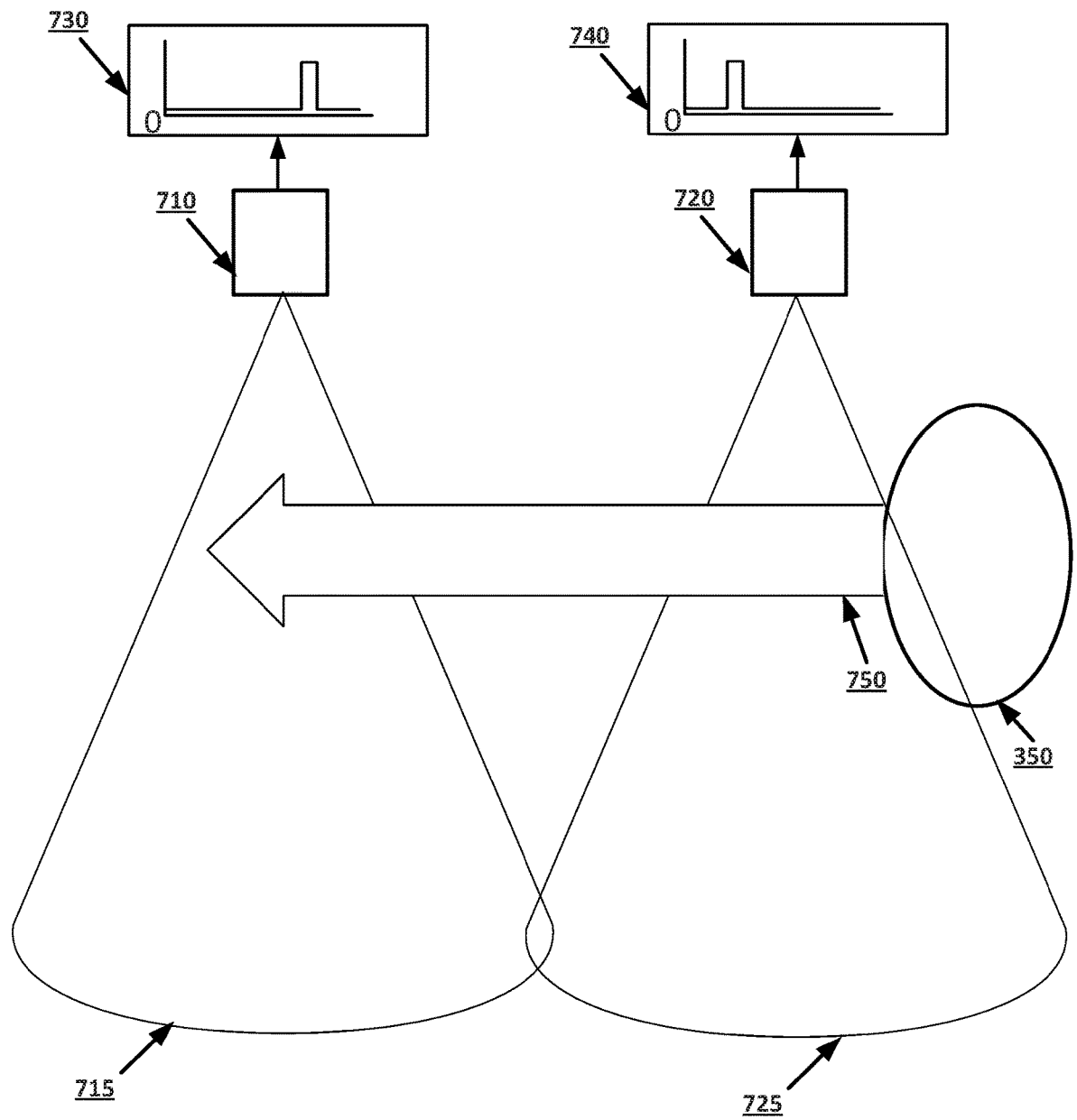
FIG. 7B shows an example arrangement suitable for presence and directional motion detection according to an implementation of the disclosed subject matter.

FIG. 7B shows an example arrangement suitable for presence and directional motion detection according to an implementation of the disclosed subject matter. The person 350 may move on a path 750 across the front of the sensors 710 and 720. The person 350 may first enter the field of view 725 of the sensor 720, and then pass through the field of view 715 of the sensor 710. The sensor 720 may produce a signal 740. The signal 740 may include a single pulse generated when the person 350 passes through the field of view 725. The sensor 710 may produce a signal 730. The signal 730 may include a single pulse generated when the person 350 passes through the field of view 715 after passing through the field of view 725. The pulse in the signal 740 may occur before the pulse in the signal 730. The direction detector 120 may be able to determine from the signal 730 and the signal 740 that the person 350 moved from left to right in front of the sensors 710 and 720 from the point of view of the sensors 710 and 720, as the pulse in the signal 740 may occur before the pulse in the signal 730. The direction detector 120 may be aware that the sensor 710 and the sensor 720 are located in proximity to each other, and that the sensor 720 is to the left of the sensor 710 from the point of view of the sensor 710.

Figure 7C:
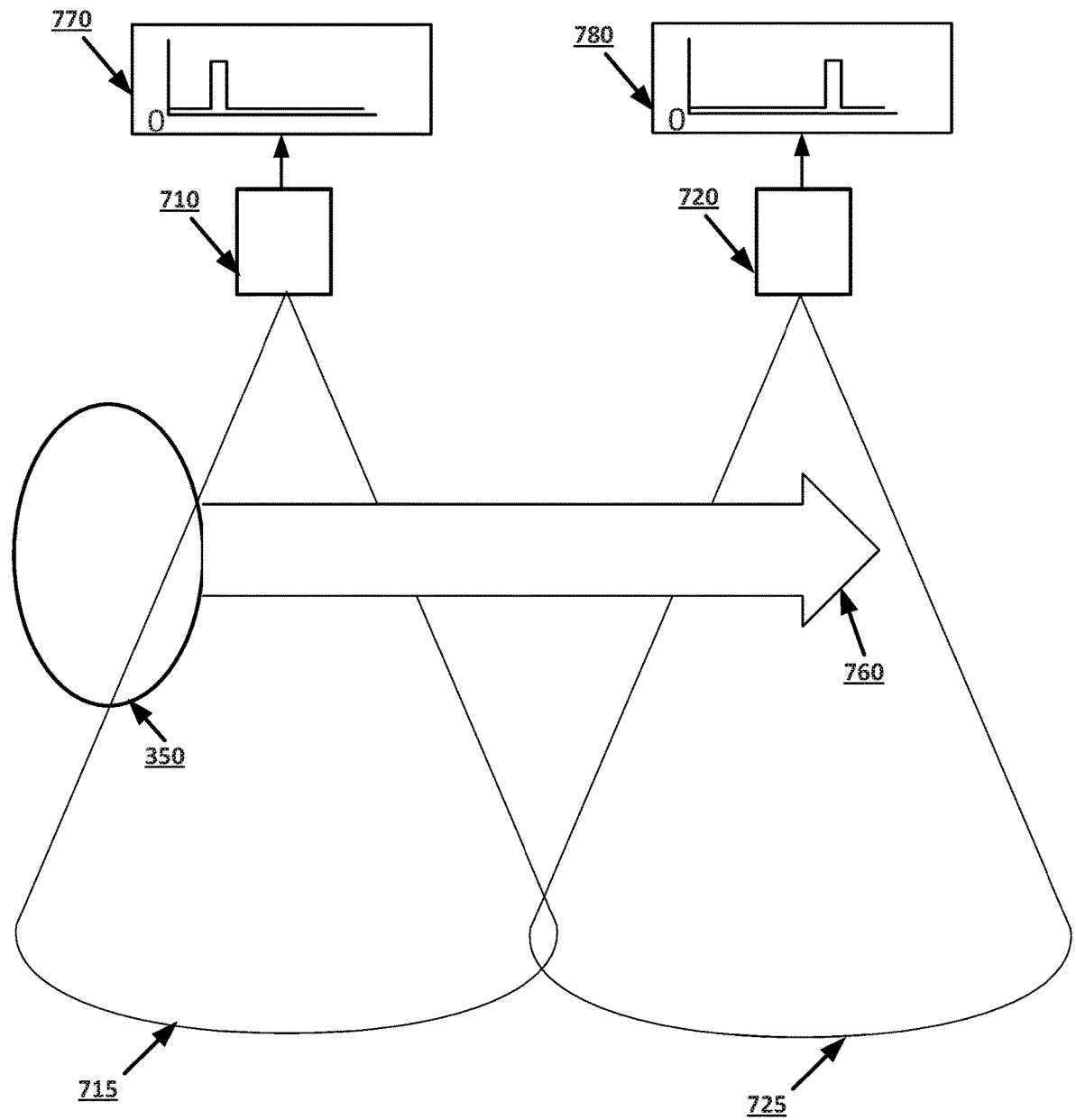
FIG. 7C shows an example arrangement suitable for presence and directional motion detection according to an implementation of the disclosed subject matter.

FIG. 7C shows an example arrangement suitable for presence and directional motion detection according to an implementation of the disclosed subject matter. The person 350 may move on a path 760 across the front of the sensors 710 and 720. The person 350 may first enter the field of view 715 of the sensor 710, and then pass through the field of view 725 of the sensor 720. The sensor 710 may produce a signal 770. The signal 770 may include a single pulse generated when the person 350 passes through the field of view 715. The sensor 720 may produce a signal 780. The signal 780 may include a single pulse generated when the person 350 passes through the field of view 725 after passing through the field of view 715. The pulse in the signal 770 may occur before the pulse in the signal 780. The direction detector 120 may be able to determine from the signal 770 and the signal 780 that the person 350 moved from right to left in front of the sensors 710 and 720 from the point of view of the sensors 710 and 720, as the pulse in the signal 770 may occur before the pulse in the signal 780. The direction detector 120 may be aware that the sensor 710 and the sensor 720 are located in proximity to each other, and that the sensor 720 is to the left of the sensor 710 from the point of view of the sensor 710.

Figure 8:
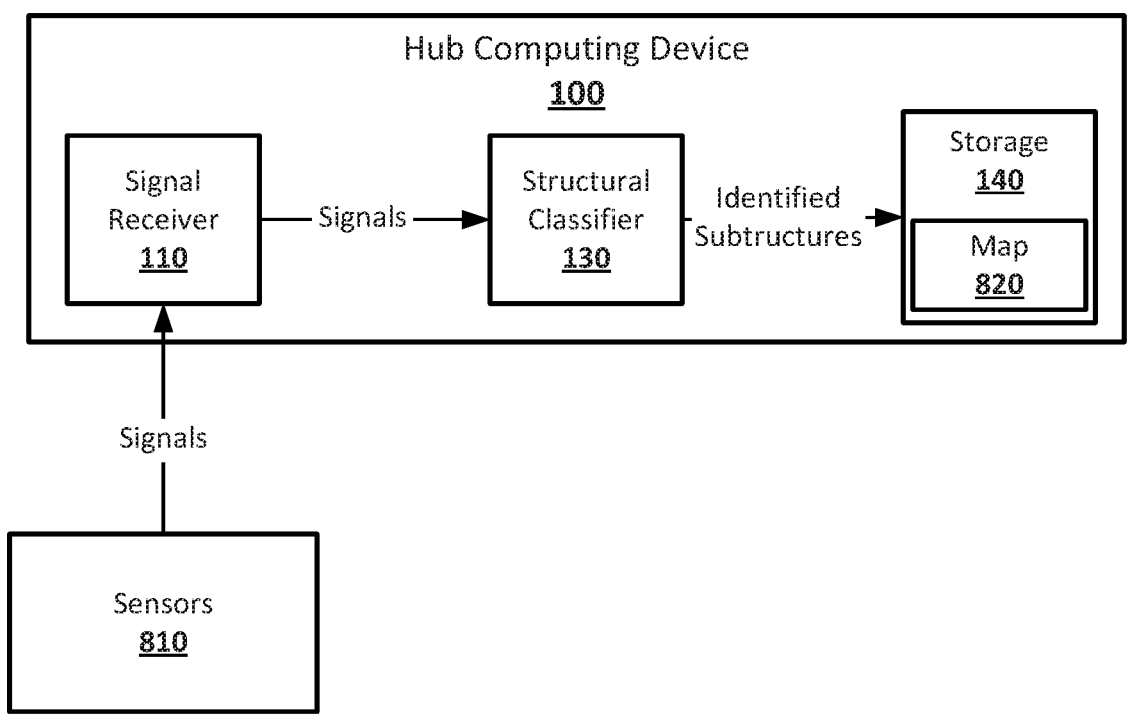
FIG. 8 shows an example arrangement suitable for presence and directional motion detection according to an implementation of the disclosed subject matter.

FIG. 8 shows an example arrangement suitable for presence and directional motion detection according to an implementation of the disclosed subject matter. The signal receiver 110 may receive signals from sensors 810 in the structure of the smart home environment. The sensors 810 may be any suitable sensors for detecting motion within structure, including, for example, PIR sensors, radar sensors, ultrasonic sensors, and photodiode-based sensors. The signals may include, for example, signals and other data generated by the sensors 810, which may be based on, for example, motion detected by the sensors 810 through the detection of moving heat sources or the reflection of radar or ultrasonic waves. The structural classifier 130 may receive the signals from the signal receiver 110. The structural classifier 120 may generate an indication of identified substructures based on the signals from the sensors 810. The indication of identified substructures may indicate, for example, different types of substructures, such as hallways, corners, and T-junctions, that the structural classifier has identified within the structure of the smart home environment based on directional motion patterns detected from the signals from the sensors 810. In some implementations, the structural classifier 130 may receive indications of directional motion from the direction detector 120 instead of receiving the signals from the sensors 810 through the signal receiver 110. The indications of identified substructures may be stored in the storage 140 as part of a map 820 of the structure.

FIG. 9A shows an example environment suitable for presence and directional motion detection according to an implementation of the disclosed subject matter. A room 910 may be adjoined to a hallway 913 through an entryway, which may be open, or may include a door. A room 920 may be on the other side of the hallway 913 from the room 910 and may also be connected to the hallway 913 by an entryway. The sensor 210 may be may be located near the entryway to the room 910 such that the sensor 210 may monitor the entryway to the room 910. The sensor 210 may have the field of view 315. A sensor 931 may be may be located near the entryway to the room 920 such that the sensor 931 may monitor the entryway to the room 920. The sensor 931 may have a field of view 941. The hallway 913 may form a T-junction with a hallway 914. Sensors 932, 933, 934, and 935, with fields of view 942, 943, 944, and 945 may be positioned in the hallway 914.

The signal receiver 110 may receive signals from the sensors 210, 931, 932, 933, 934, and 935. The signals may be sent to the structural classifier 130, which may use the signals to determine motion patterns 990 through the rooms 910 and 920 and the hallways 913 and 914. The motion patterns 990 may be determined based on, for example, the times at which various sensors detect motion and the direction of the motion. For example, the signals may indicate that soon after the sensor 210 detects right to left motion, either the sensor 933 detects left to right motion or the sensor 932 detects right to left motion. The signals may indicate that after the sensor 933 detects left to right motion, the sensor 934 also detects left to right motion. The signals may indicate that after the sensor 933 detects right to left motion, either the sensor 932 detects right to left motion, the sensor 210 detects left to right motion into the room 910, or the sensor 931 detects right to left motion into the room 920. The structural classifier 130 may determine that the sensors 210, 931, 932, 933, 934, and 935 are arranged around a T-junction, for example, as formed by the hallways 913 and 914 based on the motion patterns indicated by the signals from the sensors 210, 931, 932, 933, 934, and 935. The structural classier 130 may also identify the hallways 913 and 914.

FIG. 9B shows an example environment suitable for presence and directional motion detection according to an implementation of the disclosed subject matter. A room 940 may be adjoined to a hallway 916 through an entryway, which may be open, or may include a door. A sensor 937 may be may be located near the entryway to the room 940 such that the sensor 937 may monitor the entryway to the room 940. The sensor 937 may have a field of view 947. The hallway 916 may form a corner with a hallway 917. Sensors 938 and 939, with fields of view 948 and 949, may be positioned in the hallway 917.

The signal receiver 110 may receive signals from the sensors 937, 938, and 939. The signals may be sent to the structural classifier 130, which may use the signals to determine motion patterns 995 through the room 940 and the hallways 916 and 917. The motion patterns 995 may be determined based on, for example, the times at which various sensors detect motion and the direction of the motion. For example, the signals may indicate that soon after the sensor 937 detects right to left motion, the sensor 938 detects left to right, and then the sensor. The signals may indicate that after the sensor 933 detects left to right motion, the sensor 934 also detects left to right motion. The signals may indicate that after the sensor 938 detects right to left motion, the sensor 939 detects left to right motion. The structural classifier 130 may determine that the sensors 937, 938, and 939 are arranged around a corner, for example, as formed by the hallways 916 and 917, based on the motion patterns indicated by the signals from the sensors 937, 938, and 939. The structural classier 130 may also identify the hallways 916 and 917.

Figure 10:
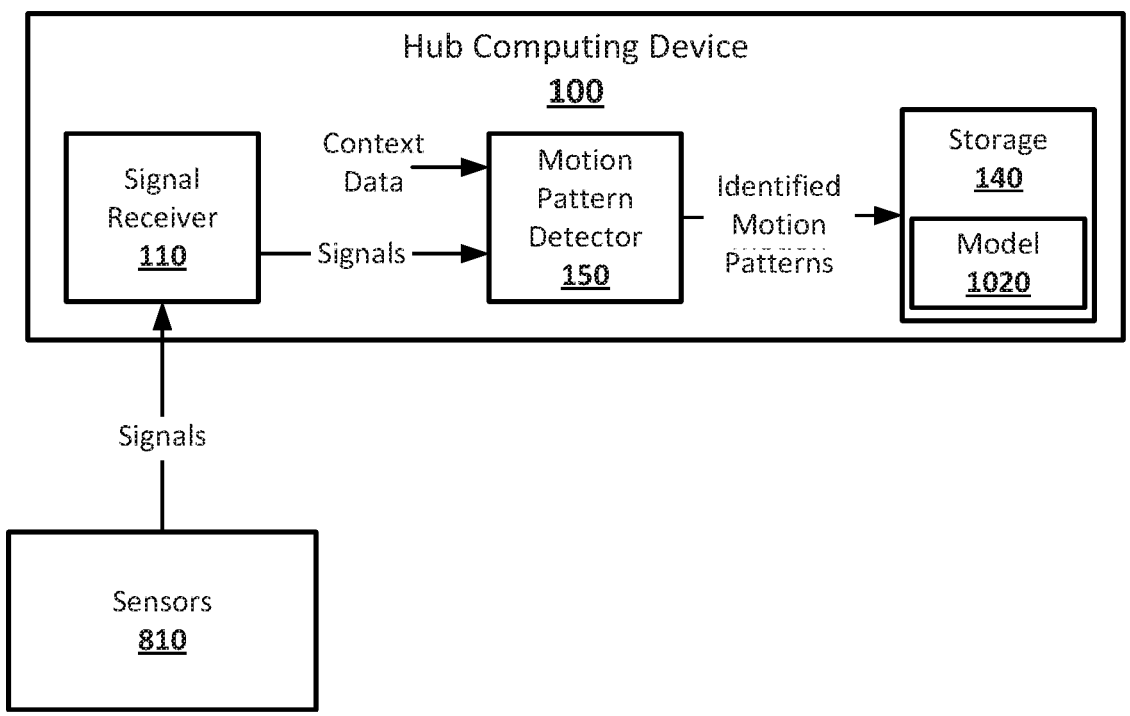
FIG. 10 shows an example arrangement suitable for presence and directional motion detection according to an implementation of the disclosed subject matter.

FIG. 10 shows an example arrangement suitable for presence and directional motion detection according to an implementation of the disclosed subject matter. The signal receiver 110 may receive signals from the sensors 810 in the structure of the smart home environment. The motion pattern detector 150 may receive the signals from the signal receiver 110. The motion pattern detector 150 may also receive context data, for example, through other components of the hub computing device 100. The context data may include, for example, the time of day, day of week, geo-location data, and any other suitable data about the structure or context in which the signals from the sensors 810 are received. The motion pattern detector 150 may implement any suitable online, unsupervised machine learning system which may use the context data and signals to identify motion patterns from the signals that may be associated with the context data. For example, the motion pattern detector 150 may identify the types of motion expected in different rooms of the structure at various times of day and day of the week based on motions that are repeated by the occupants at similar times on similar days over some period of time. The identified motion patterns may be stored as a model 1020, which may be any suitable model for a machine learning system, such as, for example, a set of weights for a neural network. In some implementations the motion pattern detector 150 may implement supervised machine learning, for example, using suitable training data generated for various structure types and occupants. The motion pattern detector 150 may be trained for any suitable period of time within the structure in order to allow for the model 1020 to accurately represent the motion patterns of the occupants of the structure of the smart home environment.

Figure 11A:
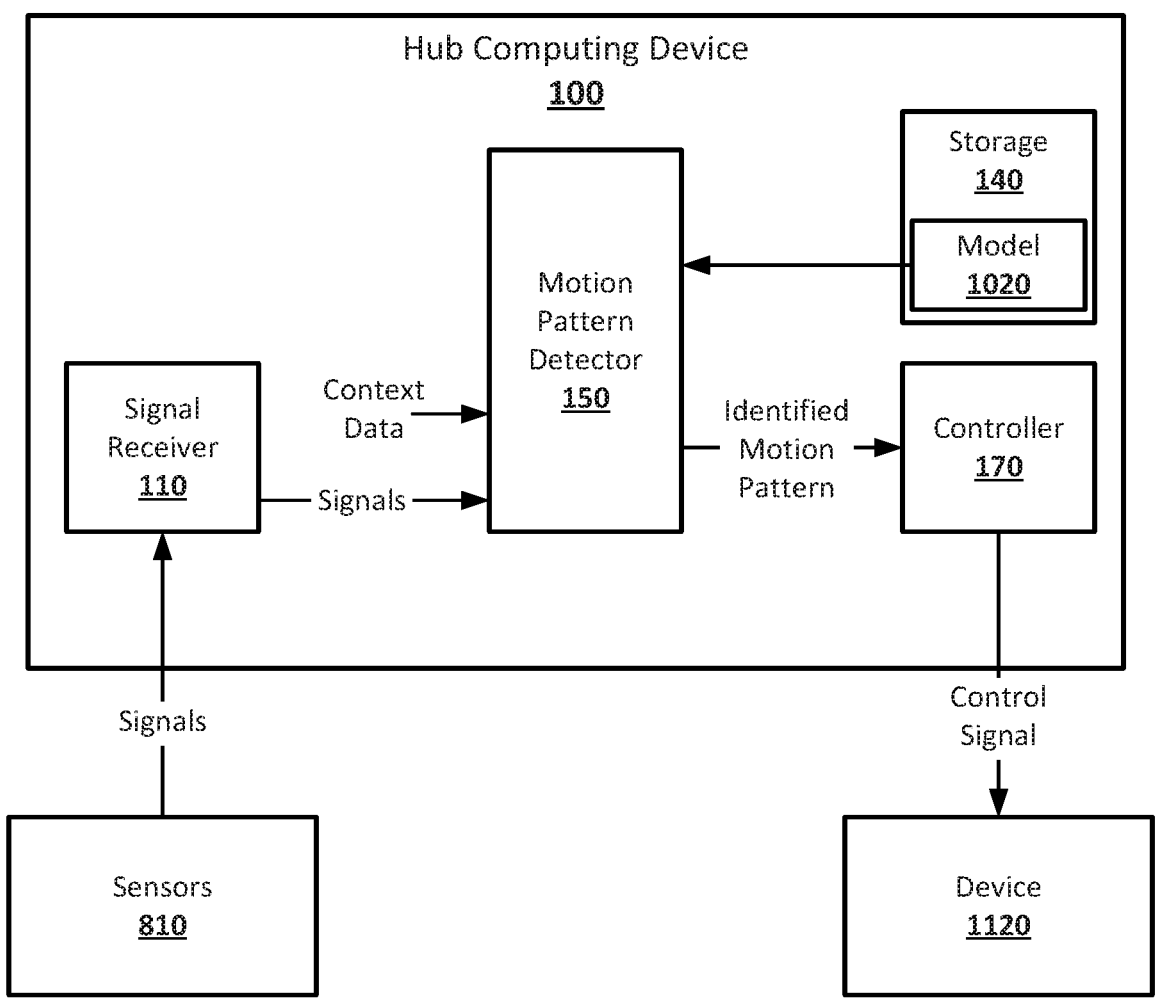
FIG. 11A shows an example arrangement suitable for presence and directional motion detection according to an implementation of the disclosed subject matter.

FIG. 11A shows an example arrangement suitable for presence and directional motion detection according to an implementation of the disclosed subject matter. The signal receiver 110 may receive signals from the sensors 810 in the structure of the smart home environment. The motion pattern detector 150 may receive the signals from the signal receiver 110. The motion pattern detector 150 may also receive the context data, for example, through other components of the hub computing device 100. The motion pattern detector 150 may, using the model 1020, determine which learned motion patterns may be present in the signals from the sensors 810 and the context data. For example, the motion pattern detector 150 may identify a person moving into a particular room in the evening on weekday, corresponding to motion pattern identified during the online training of the motion pattern detector 150 and represented in the model 1020. An indication of this identified motion pattern may be sent to the controller 170.

The controller 170 may receive the indication of the identified motion pattern from the motion pattern detector 150. The controller 170 may generate a control signal that may be transmitted to a device 1120. The device 1120 may be any suitable controllable device in the structure connected to the hub computing device 100, such as, for example, a light switch. The control signal may be transmitted over any suitable wired or wireless connection between the hub computing device 100 and the device 1120, including, for example, through a mesh wireless connection which relays the control signal through other devices. The control signal may be based on the indication of directional motion, the location of the device 220, and any rules for control of the device 220. For example, device 220 may a be light switch for a desk light in a room of the structure. An indication of an identified motion pattern that includes a person entering the room with the desk light in the evening on a weekday may result in a control signal to the device 1120 that turns on the light switch for the desk light. The controller 170 may generate multiple control signals for multiple devices based on a single indication of an identified motion pattern. For example, an indication of a motion pattern that includes a person exiting a bedroom in the morning on a weekday may include the turning of light switches in multiple rooms, the opening of controllable blinds or shades, or the activation of controllable kitchen appliances such as a coffee maker. The control signal sent from the controller 170 may be timed, or include timing information, based on the identified motion pattern. For example, an identified motion pattern that includes a person moving down a hallway may result in a control signal that turns on lights in the hallway at the expected arrival time of the person at the lights as they move down the hallway.

Figure 11B:
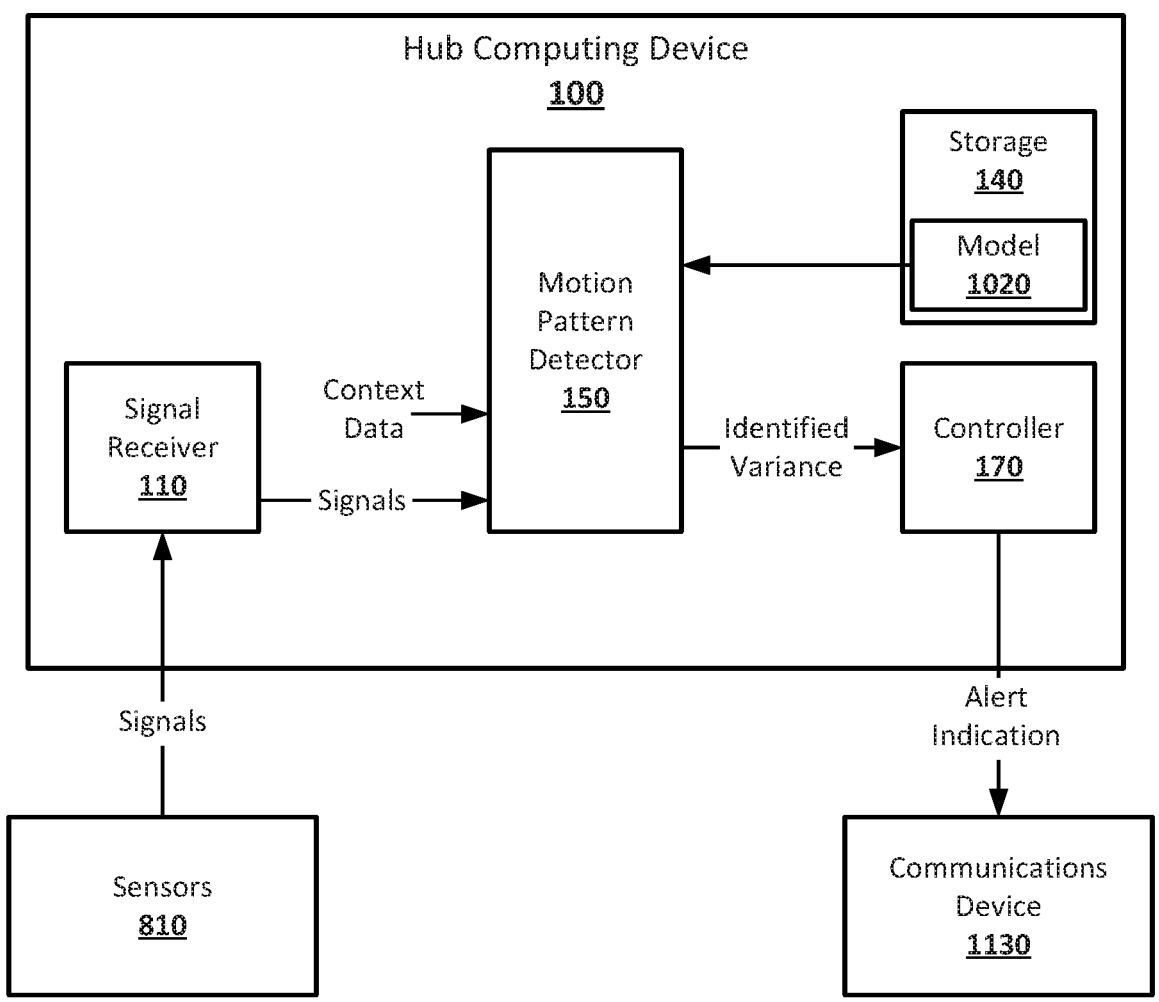
FIG. 11B shows an example arrangement suitable for presence and directional motion detection according to an implementation of the disclosed subject matter.

FIG. 11B shows an example arrangement suitable for presence and directional motion detection according to an implementation of the disclosed subject matter. The signal receiver 110 may receive signals from the sensors 810 in the structure of the smart home environment. The motion pattern detector 150 may receive the signals from the signal receiver 110. The motion pattern detector 150 may also receive the context data, for example, through other components of the hub computing device 100. The motion pattern detector 150 may, using the model 1020, determine which identified motion patterns may be present in the signals from the sensors 810 and the context data. The motion pattern detector 150 may also determine when motion or lack of motion present in the signals diverges from learned motion patterns based on the context data. For example, the motion pattern detector 150 may identify a person moving into a particular room at 3:00 am on weeknight, which may not correspond to any motion pattern identified during the online training of the motion pattern detector 150 and represented in the model 1020. The identified motion may, based on the context data, diverge far enough from any previously identified motion patterns that that the motion pattern detector 150 may send an indication of an identified divergence to the controller 170. The indication of divergence may indicate the possibility that an intruder to the structure has been detected, and may include, for example, the area of the structure in which the motion was detected, and direction and speed of the motion both generally, and relative to the location of an occupant of the structure. An indication of an identified divergence may also be sent when, for example, the motion pattern detector 150 detects lack of motion in a context in which an identified motion pattern is expected. For example, an identified motion pattern represented in the model 1020 may include a person entering the kitchen between 8:30 am and 9:00 am every weekday. If, based on the signals from the sensors 810 and the context data indicate, the motion pattern detector 150 determines that no one has entered the kitchen between 8:30 am and 9:00 am on a weekday, an indication of an identified divergence may be transmitted to the controller 170.

The controller 170 may receive the indication of the identified divergence from the motion pattern detector 150. The controller 170 may generate an alert indication that may be transmitted to a communications device 1130. The communications device 1130 may be any suitable device for communications. For example, the communications device 1130 may be a computing device, such as a laptop, smartphone, or other computing system controlled by, for example, an emergency services organization. The communications device 1130 may also be, for example, a speaker system that may audibly communicate an alert of a display system that may display an alert. The alert indication may include an indication of the type of divergence that was detected by the motion pattern detector 150. For example, if the divergence resulted from detecting motion that diverges from learned motion patterns, the alert indication may indicate the presence of an intruder, and may include additional information, including the location of the intruder and the direction and speed of motion of the intruder. If the divergence resulted from not detecting expected motion as per learned motion patterns, the alert indication may indicate a lack of expected motion and a possible need for emergency services. The controller 170 may also transmit control signals in response to the indication of a divergence, for example, activating controllable locks in the vicinity of a possible intruder.

Figure 12:
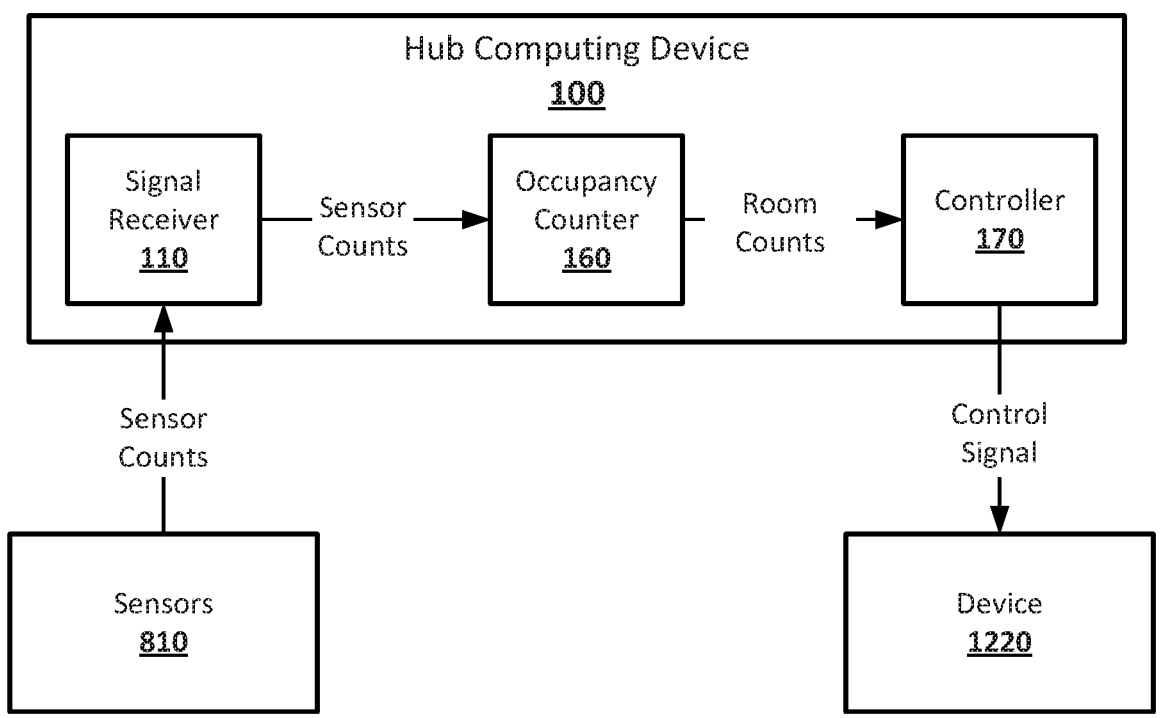
FIG. 12 shows an example arrangement suitable for presence and directional motion detection according to an implementation of the disclosed subject matter.

FIG. 12 shows an example arrangement suitable for presence and directional motion detection according to an implementation of the disclosed subject matter. The signal receiver 110 may receive sensor counts from the sensors 810 in the structure of the smart home environment. The sensor counts may be counts kept by each sensor of the sensors 810, for example, microcontroller, based on directional motion in front of the sensor. For example, a sensor in the entryway to a room may increase its count by one whenever motion in front of the sensor from outside the room to inside the room is detected and may decrease its count by one whenever motion from inside the room to outside the room is detected. Sensor counts may start at zero when a sensor is initially set up, and may be positive, negative, or zero, as people move in and out of rooms. A sensor count may be negative when, for example, a person exits a room via a different entryway then they used to enter the room. The occupancy counter 160 may receive the sensor counts from the signal receiver 110. The occupancy counter 160 may generate room counts based on the sensor counts from the sensors 810. The room counts may be counts of the number of occupants of rooms of a structure and may also include counts of occupants of hallways and other areas of the structure. The occupancy counter 160 may generate the room counts by collating sensor counts from the sensors that monitor entryway to the same rooms, hallways, or other structures, based on location data for the sensors. For example, if a room has a single entryway, the sensor count from the sensor of the sensor 810 that monitors the entryway may also be the room count for the room. If a room has multiple entryways, the sensor counts from the sensors that monitor these entryways may be summed together to generate a room count for the room. The room counts may be sent to the controller 170.

The controller 170 may receive the room counts from the occupancy counter 160. The controller 170 may generate a control signal that may be transmitted to a device 1220. The device 1220 may be any suitable controllable device in the structure connected to the hub computing device 100, such as, for example, a light switch. The control signal may be transmitted over any suitable wired or wireless connection between the hub computing device 100 and the device 1220, including, for example, through a mesh wireless connection which relays the control signal through other devices. The control signal may be based on the room counts, the location of the device 1220, and any rules for control of the device 1220. For example, the device 1220 may a be light switch in a room for which the occupancy counter 160 has generated a room count. A room count of zero, indicating that the room is empty, may cause the controller 170 to send a control signal to the device 1220 turning off the light switch. The controller 170 may also refrain from sending control signals based on room counts. For example, if the light switch 1220 is already on, the controller 170 may not send a control signal to turn off the light switch while the room count for the room indicates that there are occupants in the room, even if no motion has been detected in the room. The controller 170 may generate control signals for multiple devices based on the room count for a single room, for example, turning on or off multiple light switches.

Figure 13:
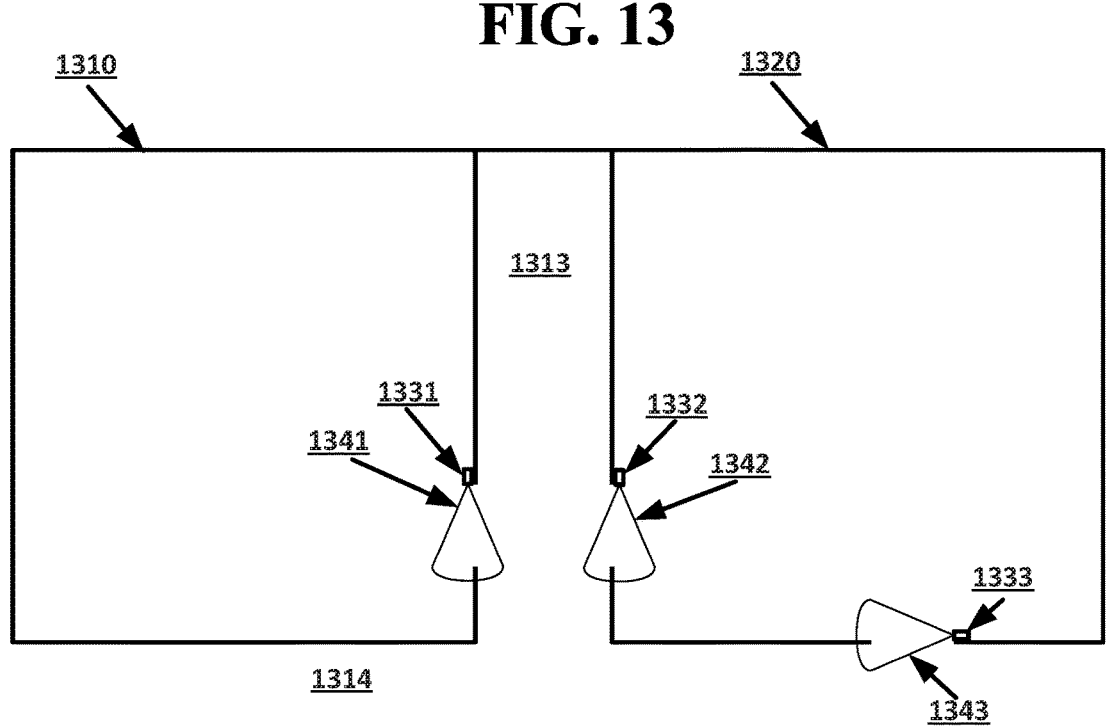
FIG. 13 shows an example environment suitable for presence and directional motion detection according to an implementation of the disclosed subject matter.

FIG. 13 shows an example environment suitable for presence and directional motion detection according to an implementation of the disclosed subject matter. A room 1310 may be adjoined to a hallway 1313 through an entryway, which may be open, or may include a door. A room 1320 may be on the other side of the hallway 1313 from the room 1310 and may also be connected to the hallway 1313 by a first entryway. The room 1320 may have a second entryway connecting it to a hallway 1314. A sensor 1331 may be may be located near the entryway to the room 1310 such that the sensor 1331 may monitor the entryway to the room 1310. The sensor 1331 may have the field of view 1341. A sensor 1332 may be may be located near the first entryway to the room 1320 such that the sensor 1332 may monitor the first entryway to the room 1320. The sensor 1332 may have a field of view 1342. A sensor 1333 may be may be located near the second entryway to the room 1320 such that the sensor 1333 may monitor the second entryway to the room 1320. The sensor 1333 may have a field of view 1343.

When the sensor 1331 detects left to right motion in front of the sensor 1331 across the field of view 1332, the sensor 1331 may increase its count by one, as the motion may be a person moving from the hallway 1313 into the room 1310. When the sensor 1331 detects right to left motion, the sensor 1331 may decrease its count by one, as the motion may be a person moving from the room 1310 in to the hallway 1313. The count for the sensor 1331 may be used by the occupancy counter 160 as the count for the room 1320, as the room 1320 may have only one entryway.

When the sensor 1332 detects right to left motion in front of the sensor 1332 across the field of view 1342, the sensor 1332 may increase its count by one, as the motion may be a person moving from the hallway 1313 into the room 1320. When the sensor 1332 detects left to right motion, the sensor 1332 may decrease its count by one, as the motion may be a person moving from the room 1320 in to the hallway 1313. When the sensor 1333 detects left to right motion in front of the sensor 1333 across the field of view 1343, the sensor 1333 may increase its count by one, as the motion may be a person moving from the hallway 1314 into the room 1320. When the sensor 1333 detects right to left motion, the sensor 1333 may decrease its count by one, as the motion may be a person moving from the room 1320 in to the hallway 1314. The count for the sensors 1332 may be summed with the count for the sensor 1333 by the occupancy counter 160 when determining the room count for the room 1320. For example, the count for the sensor 1332 may be 2, while the count for the sensor 1333 may be −1, resulting in a room count of 1, and indicating that two people may have entered the room 1320 by crossing in front of the sensor 1332, and one person may have exited the room 1320 by crossing in front of the sensor 1333.

Figure 14:
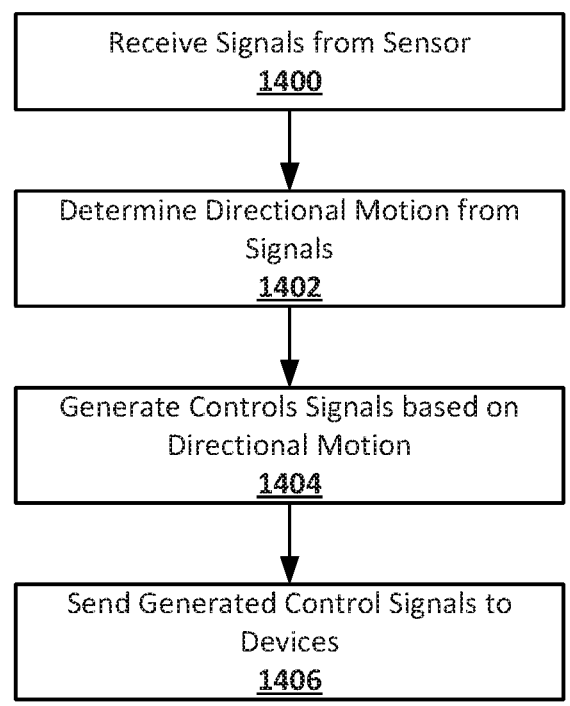
FIG. 14 shows an example of a process suitable for presence and directional motion detection according to an implementation of the disclosed subject matter.

FIG. 14 shows an example of a process suitable for presence and directional motion detection according to an implementation of the disclosed subject matter. At 1400, signals may be received from a sensor. For example, the direction detector 120 may receive signals from the signal receiver 110, which may have received signals generated by the sensor 210.

At 1402, directional motion may be determined from the signals. For example, the direction detector 120 may be a machine learning system which may have been trained to associate signals from a single sensor such as the sensor 210 with different types of directional motion, allowing for motion detection using a single sensor. The signals from the sensor 210 may be input to the direction detector 120, which may output an indication of directional motion that may include whether the signals from the sensor 210 indicate directional motion, and what type of directional motion they indicate. For example, the signals may indicate left to right motion in front of the sensor 210, right to left motion in front of the sensor 210, or no motion in front of the sensor 210. The indication of directional motion output by the direction detector 120 may also include an identification of the sensor 210, and may include, for example, a location of the sensor 210 within the structure of the smart home environment.

At 1404, control signals for devices may be generated based on the determined directional motion. For example, the controller 170 may receive the indication of directional motion output by the direction detector 120 based on the signals from the sensor 210. The controller 170 may determine, based on the indication of directional motion and other data about the sensor 210, such as the location of the sensor 210 in the structure, what controls signals to generate and transmit to devices of the smart home environment, including devices within the structure. For example, the device 220 may be a light switch in a room, and the sensor 210 may monitor the entryway to the room. When the indication of directional motion indicates motion into the room, the controller 170 may generate a control signal to turn on the light switch. When the indication of directional motion indicate motion out of the room, the controller 170 may generate a control signal to turn off the light switch. When the indication of directional motion indicates no motion, the controller 170 may not generate a control signal, and may leave the light switch in its current state.

At 1406, generated control signals may be sent to devices. For example, the controller 170 may have generated a control signal to turn on or turn off the device 220, which may be a light switch. The control signal may be sent to the device 220, which may implement the control signal. The controller 170 may generate and send any number of control signals to any number of devices based on the indication of directional motion determined for a single sensor. The determination of directional motion for a sensor such as the sensor 210 may be continuous as the sensor generates signals, and the generation of control signals in response to the determined indications of directional motion may also be continuous. When the controller 170 does not generate a control signal in response to an indication of directional motion, no control signal may be sent to any devices.

Figure 15:
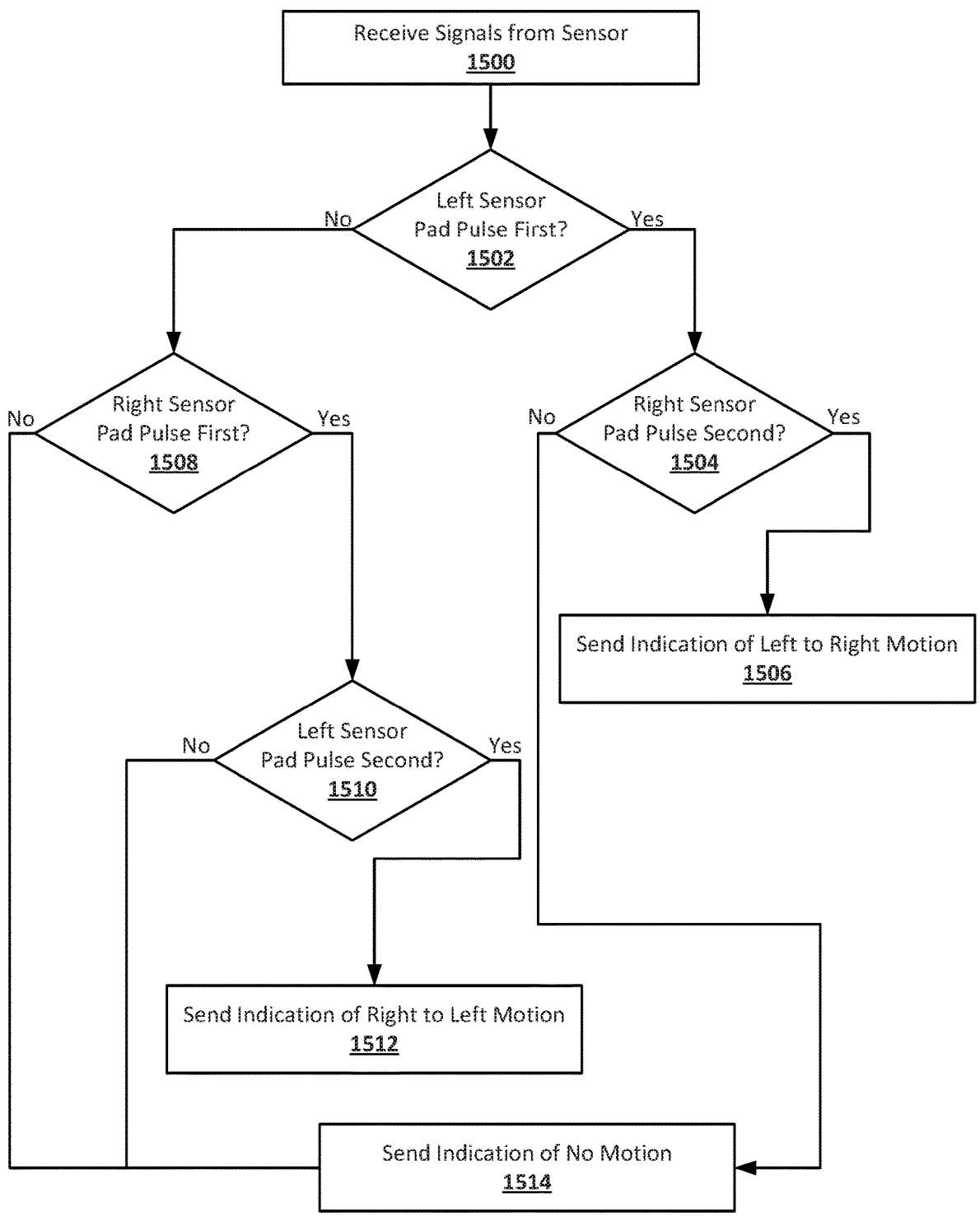
FIG. 15 shows an example of a process suitable for presence and directional motion detection according to an implementation of the disclosed subject matter.

FIG. 15 shows an example of a process suitable for presence and directional motion detection according to an implementation of the disclosed subject matter. At 1500, signals may be received from a sensor. For example, the direction detector 120 may receive signals from the signal receiver 110, which may have received signals generated by the sensor 210, which may be a PIR sensor with two sensor pads such as the PIR sensor 410.

At 1502, if the signals indicate a left sensor pad generated a first pulse in the signal, flow may proceed to 1504.

Otherwise, flow may proceed to 1508. For example, the two sensor pads 420 and 430 of the PIR sensor 410 may be arranged next to each other relative to their fields of view 425 and 435. The left sensor pad 430 may be to the left of the right sensor pad 420 and may be oriented to generate a positive pulse when a heat source moves across the field of view 435. The right sensor pad 420 may be oriented to generate a negative pulse when a heat source moves across the field of view 425. If the signal from the PIR sensor 410 includes a positive pulse first, this may indicate that a heat source was detected moving in the field of view 435 of the left sensor pad 430 that did not move through the field of view 425 of the right sensor pad 420 first.

At 1504, if the signals indicate a right sensor pad generated a second pulse, flow may proceed to 1506. Otherwise, flow may proceed to 1514. For example, if the signal includes a negative pulse from the right sensor pad 420 following the positive pulse from the left sensor pad 430, this may indicate that a person moved across the front of the PIR sensor 410 from left to right.

At 1506, an indication of left to right motion may be sent. For example, the signals received from the PIR sensor 410 may include a positive pulse from the left sensor pad 430 followed by a negative pulse from the right sensor pad 420, indicating that a person moved across the front of the PIR sensor 410 from left to right. The direction detector 120 may send an indication of directional motion to the controller 170 indicating the movement of a person from left to right in front of the PIR sensor 410.

At 1508, if the signals indicate a right sensor pad generated a first pulse in the signal, flow may proceed to 1504. Otherwise, flow may proceed to 1514. For example, if the signal from the PIR sensor 410 includes a negative pulse first, this may indicate that a heat source was detected moving in the field of view 425 of the right sensor pad 420 that did not move through the field of view 435 of the left sensor pad 430 first.

At 1510, if the signals indicate a left sensor pad generated a second pulse, flow may proceed to 1512. Otherwise, flow may proceed to 1514. For example, if the signal includes a positive pulse from the left sensor pad 430 following the negative pulse from the right sensor pad 420, this may indicate that a person moved across the front of the PIR sensor 410 from right to left.

At 1512, an indication of right to left motion may be sent. For example, the signals received from the PIR sensor 410 may include a negative pulse from the right sensor pad 420 followed by a positive pulse from the left sensor pad 430, indicating that a person moved across the front of the PIR sensor 410 from right to left. The direction detector 120 may send an indication of directional motion to the controller 170 indicating the movement of a person from right to left in front of the PIR sensor 410.

At 1514, an indication of no motion may be sent. For example, the signals received from the PIR sensor 410 may include no pulses, indicating no motion detected by either the right sensor pad 420 or the left sensor pad 430, or may include a first pulse, either positive or negative, but no second pulse, indicating that a person may be stopped in front of the PIR sensor 410, or may have moved into either the field of view 425 or 435 and the moved out of field of view without crossing the other field of view. The direction detector 120 may send an indication to the controller 170 indicating no motion in front of the PIR sensor 410.

Figure 16:
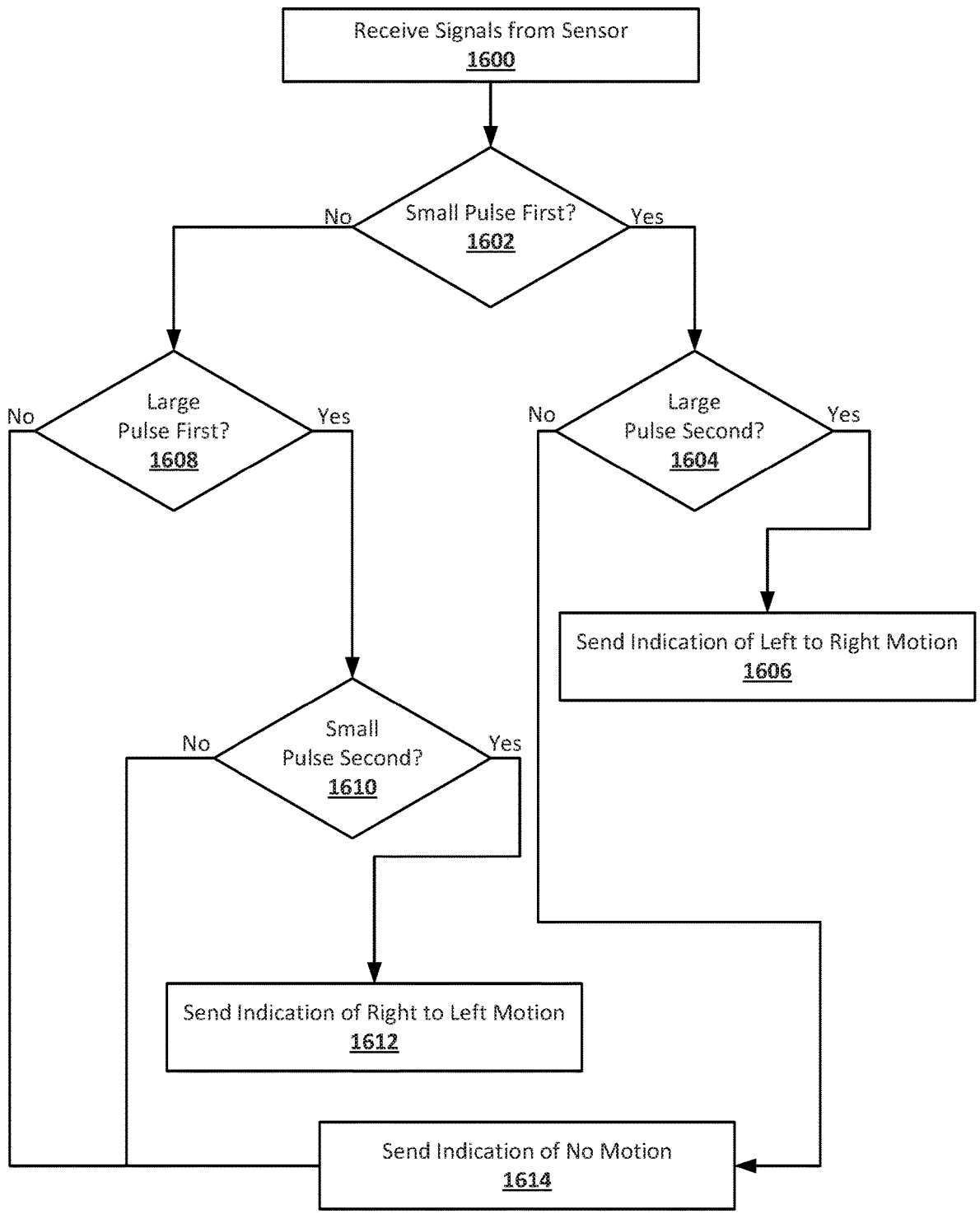
FIG. 16 shows an example of a process suitable for presence and directional motion detection according to an implementation of the disclosed subject matter.

FIG. 16 shows an example of a process suitable for presence and directional motion detection according to an implementation of the disclosed subject matter. At 1600, signals may be received from a sensor. For example, the direction detector 120 may receive signals from the signal receiver 110, which may have received signals generated by the sensor 210, which may be an asymmetric lens sensor with two asymmetric lenses such as the asymmetric lens sensor 510.

At 1602, if the signals indicate a small pulse is the first pulse in the signal, flow may proceed to 1604. Otherwise, flow may proceed to 1608. For example, the large lens 530 and small lens 540 of the asymmetric lens sensor 510 may be arranged next to each other relative to their fields of view 535 and 545. The small lens 540 may be to the left of the large lens. Both lenses may focus radiation on the detector 520 when an object crosses their field of view. Radiation focused through the small lens 540 may generate a smaller pulse in the signal generated by the detector 520 than radiation focused by the large lens 530. If the signal from the asymmetric lens sensor 510 includes a small pulse first, this may indicate that an object was detected moving in the field of view 545 of the small lens 540 that did not move through the field of view 535 of the large lens 530 first.

At 1604, if the signals indicate a large pulse is the second pulse in the signal, flow may proceed to 1606. Otherwise, flow may proceed to 1614. For example, if the signal includes a large pulse from radiation focused by the large lens 530 following the small pulse from radiation focused by the small lens 540, this may indicate that a person moved across the front of the asymmetric lens sensor 510 from left to right.

At 1606, an indication of left to right motion may be sent. For example, the signals received from the asymmetric lens sensor 510 may include a small pulse from radiation focused by the small lens 540 followed by a large pulse from radiation focused by the large lens 530, indicating that a person moved across the front of the asymmetric lens sensor 510 from left to right. The direction detector 120 may send an indication of directional motion to the controller 170 indicating the movement of a person from left to right in front of the asymmetric lens sensor 510.

At 1608, if the signals indicate a large pulse is the first pulse in the signal, flow may proceed to 1604. Otherwise, flow may proceed to 1614. For example, if the signal from the asymmetric lens sensor 510 includes a large pulse first, this may indicate that an object was detected moving in the field of view 535 of the large lens 530 that did not move through the field of view 545 of the small lens 540 first.

At 1610, if the signals indicate a small pulse is the second pulse in the signal, flow may proceed to 1612. Otherwise, flow may proceed to 1614. For example, if the signal includes a small pulse from radiation focused by the small lens 540 following the large pulse from radiation focused by the large lens 530, this may indicate that a person moved across the front of the asymmetric lens sensor 510 from right to left.

At 1612, an indication of right to left motion may be sent. For example, the signals received from the asymmetric lens sensor 510 may include a large pulse from radiation focused by the large lens 530 followed by a small pulse from radiation focused by the small lens 540, indicating that a person moved across the front of the asymmetric lens sensor 510 from right to left. The direction detector 120 may send an indication of directional motion to the controller 170 indicating the movement of a person from right to left in front of the asymmetric lens sensor 510.

At 1614, an indication of no motion may be sent. For example, the signals received from the asymmetric lens sensor 510 may include no pulses, indicating no motion detected by the detector 520 from radiation focused by either the large lens 530 or the small lens 540, or may include a first pulse, either large or small, but no second pulse, indicating that a person may be stopped in front of the asymmetric lens sensor 510, or may have moved into either the field of view 535 or 545 and the moved out of field of view without crossing the other field of view. The direction detector 120 may send an indication to the controller 170 indicating no motion in front of the asymmetric lens sensor 510.

Figure 17:
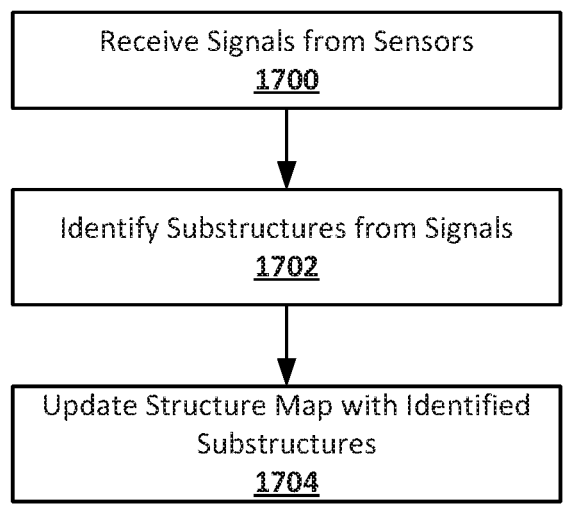
FIG. 17 shows an example of a process suitable for presence and directional motion detection according to an implementation of the disclosed subject matter.

FIG. 17 shows an example of a process suitable for presence and directional motion detection according to an implementation of the disclosed subject matter. At 1700, signals may be received from sensors. For example, the structural classifier 130 may receive signals from the signal receiver 110, which may have received signals generated by the sensors 810 distributed throughout the structure of a smart home environment.

At 1702, substructures may be identified from the signals. For example, the structural classifier 130 may be a machine learning system which may have been trained to associate signals from sensors such as the sensor 210 and the patterns of motion indicated by the signals with different types of substructures of a structure, such as, for example, corner, T-junctions, and hallways. The signals from the sensors 810 may be input to the structural classifier 130, which may output an indication of identified substructures based on motion patterns in the signals from the sensors 810. For example, the signals may indicate the presence of a T-junction near a particular set of sensors of the sensors 810, and the presence of a corner near another set of sensors of the sensors 810.

At 1704, a structure map may be updated. For example, the substructures identified by the structural classifier 810 may be used to update the map 820, which may be a map of the structure, and the substructures that make up the structure, generated based on substructures identified by the structural classifier 810. The updating of the map 820 may use the known relative locations of the sensors 810 and the structures identified near different sets of the sensors 810.

Figure 18:
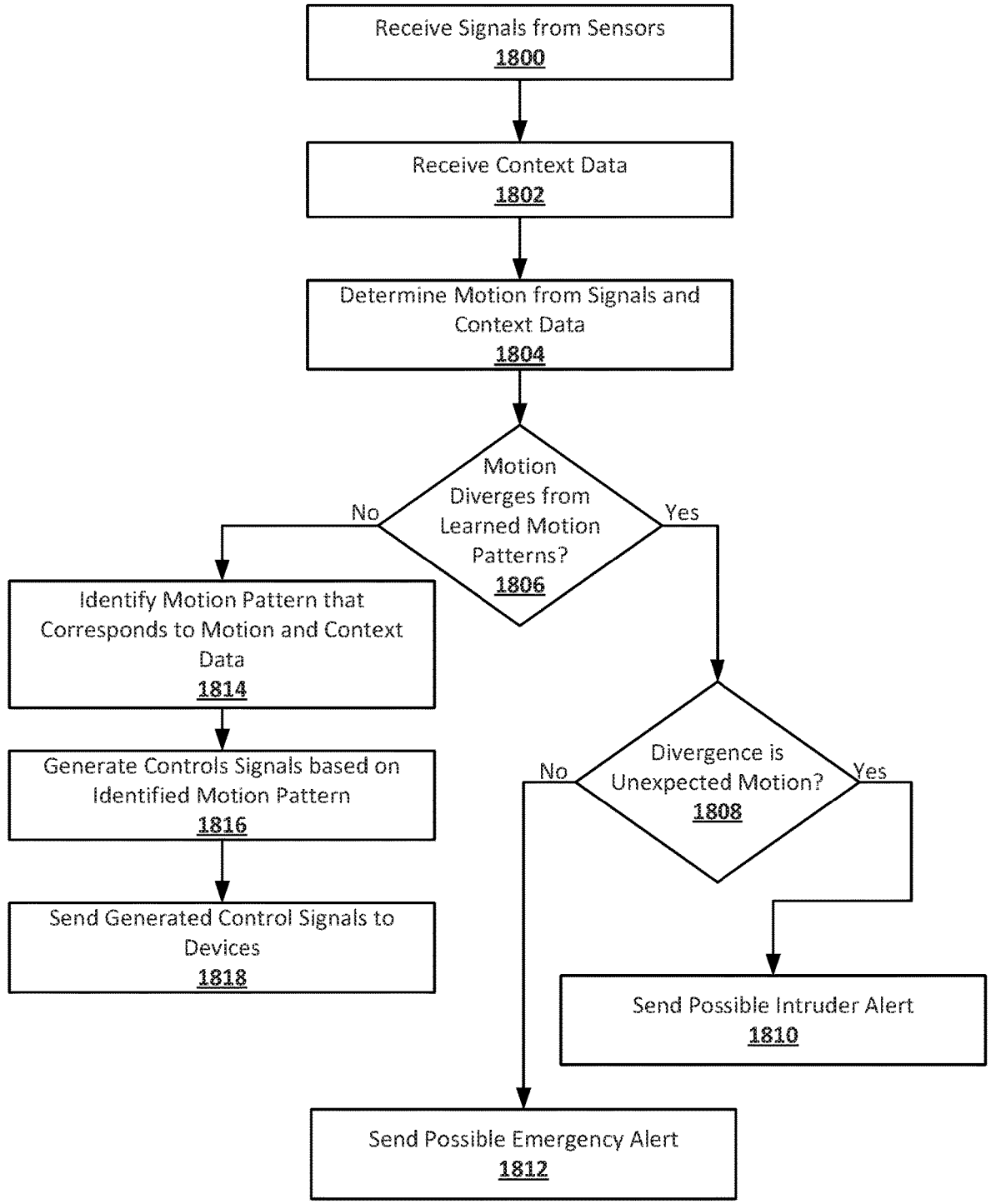
FIG. 18 shows an example of a process suitable for presence and directional motion detection according to an implementation of the disclosed subject matter.

FIG. 18 shows an example of a process suitable for presence and directional motion detection according to an implementation of the disclosed subject matter. At 1800, signals may be received from sensors. For example, the motion pattern detector 150 may receive signals from the signal receiver 110, which may have received signals generated by the sensors 810 distributed throughout the structure of a smart home environment.

At 1802, context data may be received. For example, the motion pattern detector 150 may receive data about the current context, including time of day, day of week, geolocation data, and any other suitable context data or data about the structure.

At 1804, motion patterns may be determined from the signals and the context data. For example, the motion pattern detector 150 may be a machine learning system which may have been trained online in the structure for any suitable period of time using signals from the sensors 810 and context data in order to identify motion patterns within the structure. The training may be unsupervised. The signals from the sensors 810 and the context data may be input to the motion pattern detector 150, which may determine motion from the signals 810. For example, the motion pattern detector may determine that a person is moving in a room of the structure.

At 1806, if the determined motion diverges from learned motion patterns, flow may proceed to 1808. Otherwise, flow may proceed to 1814. For example, the motion pattern detector 150 whether the determined motion, in combination with the context data, is similar to any of the learned motion patterns from the training of the motion pattern detector 150. If the determined motion, in combination with the context data, diverges from the learned motion patterns, the motion pattern detector 150 may send an indication of an identified divergence to the controller 170. Otherwise, the motion pattern detector 150 may send the identified motion pattern to which the determined motion, in combination with the context data, is most similar, to the controller 170.

At 1808, if the divergence is the result of the determined motion being unexpected motion, flow may proceed to 1810. Otherwise, flow may proceed to 1812. For example, the determined motion, in combination with the context data, may be motion that would not be expected according to the learned motion patterns. For example, the determined motion may be motion of a person entering a room which the context may indicate is occurring at 3:00 am on weekday. The learned motion patterns may include no motion patterns with motion into that room at or around 3:00 am on weekdays. The divergence from the learned motion patterns may indicate that the determined motion is unexpected, and may be caused by, for example, an intruder in the structure. The determined motion may be a lack of expected motion. For example, the determined motion may be a lack of motion into a room when the learned motion patterns indicate that motion into the room is expected. For example, the learned motion patterns may indicate that a person enters the kitchen between 8:30 am and 9:00 am on weekdays. The divergence from learned motion patterns may indicate the lack of motion is unexpected and may indicate an emergency issue with an occupant of the structure.

At 1810, a possible intruder alert may be sent. For example, the controller 170 may receive an indication of an identified divergence from the motion pattern detector 150. The indication of the identified divergence may indicate that unexpected motion has been detected in a room of the structure based on the current context, and may also indicate, for example, the direction and speed of the unexpected motion. The controller 170 may send a possible intruder alert to a communications device, such as the communications device 1130, to notify an occupant of the structure or other appropriate party such as a police department or security company.

At 1812, a possible emergency alert may be sent. For example, the controller 170 may receive an indication of an identified divergence from the motion pattern detector 150. The indication of the identified divergence may indicate that an unexpected lack of motion has been detected based on the current context, and may also indicate, for example, the room or area of the structure where the motion was expected. The controller 170 may send a possible emergency alert to a communications device, such as the communications device 1130, to notify an occupant of the structure or other appropriate party such as an emergency contact or emergency services.

At 1814, a motion pattern that corresponds to the determined motion and context data may be identified. For example, the motion pattern detector 150 may have determined that the determined motion may not show divergence from the learned motion patterns in the model 1020. The motion pattern detector 150 may identify the motion pattern from the model 1020 to which the determined motion and context indicated by the context data most closely correspond. For example, if the determined motion is the entering of the kitchen at 12:05 pm on weekend, the motion pattern detector 150 may determine that this corresponds to a learned motion pattern of the entering of the kitchen between 11:30 am and 12:15 pm on weekends. The identified motion pattern may be sent to the controller 170 as part of an indication of an identified motion pattern.

At 1816, control signals for devices may be generated based on the identified motion pattern. For example, the controller 170 may receive the indication of an identified motion pattern from the motion pattern detector 150. The controller 170 may determine, based on the indication of the identified motion pattern, what controls signals to generate and transmit to devices of the smart home environment, including devices within the structure. For example, the device 1120 may be a light switch in a room, and the identified motion pattern may indicate that a person is heading down the hallway towards the room and will enter the room. The controller 170 may generate a control signal to turn on the light switch of the device 1120 before the person reaches the room.

At 1818, generated control signals may be sent to devices. For example, the controller 170 may have generated a control signal to turn on or turn off the device 220, which may be a light switch. The control signal may be sent to the device 1220, which may implement the control signal. The controller 170 may generate and send any number of control signals to any number of devices based on the indication of an identified motion pattern determined for a single sensor.

The identification of motion patterns or divergences from motion patterns based on the signals from the sensors 810 may be continuous as the sensors generates signals, and the generation of control signals and alerts in response to the determined indications of identified motion patterns and divergences may also be continuous. The model 1020 of the motion pattern detector 150 may also be continuously updated through online supervised and unsupervised learning after the initial creation of the model 1020 through training of the motion pattern detector 150. For example, a combination of determined motion and context data that is initially considered divergent from the learned motion patterns may be learned as a new motion pattern for the model 1020 the combination recurs often enough.

Figure 19:
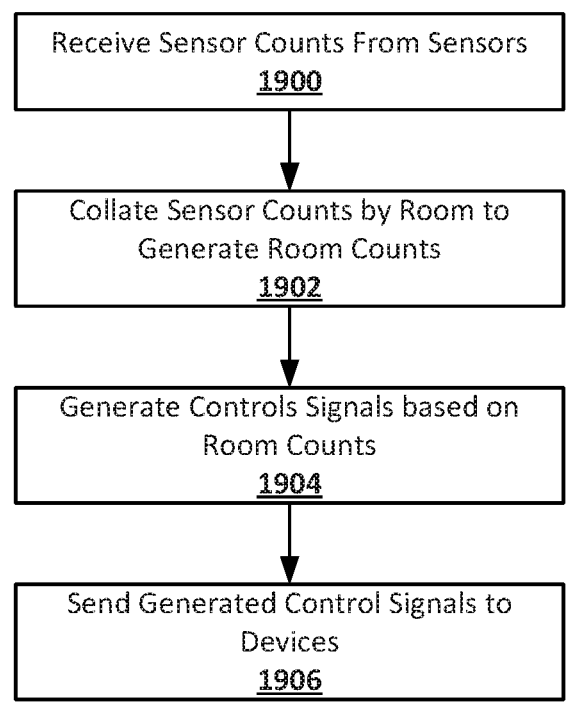
FIG. 19 shows an example of a process suitable for presence and directional motion detection according to an implementation of the disclosed subject matter.

FIG. 19 shows an example of a process suitable for presence and directional motion detection according to an implementation of the disclosed subject matter. At 1900, sensor counts may be received from sensors. For example, the occupancy counter 160 may receive sensor counts from the signal receiver 110, which may have received sensor counts generated by the sensors 810 distributed throughout the structure of a smart home environment. The sensors 810 may generate the sensor counts by counting up when a person is detected passing in front of a sensor into a room through an entryway monitored by the sensor and counting down when a person is detected passing front of the sensor out the room through the entryway. The sensor count for each sensor may be a positive number, a negative number, or zero.

At 1902, sensor counts may be collated by room to generate room counts. For example, the occupancy counter 160 may use the locations of the sensors for which sensor counts were received to collate sensor counts from sensor that monitor entryways to the same room. The collation may be, for example, the summing of the sensor counts for sensors that monitor entryways to the same room to generate a room count for the room. For example, if a room has two entryways, monitored by separate sensors with sensors counts of 2 and −1, the room count may be 1.

At 1904, control signals for devices may be generated based on the determined directional motion. For example, the controller 170 may receive room counts generated by the occupancy counter 160. The controller 170 may determine, based on room count, what controls signals to generate and transmit to devices of the smart home environment, including devices within the structure. For example, the device 1220 may be a light switch in a room. The room count for the room may be 0. If the light switch of the device 1220 is on, the controller 170 may generate a control signal to turn off the light switch. If the room count for the room was 1 while the light switch of the device 1220 is on the controller 170 may not generate a control signal and may leave the light switch in its current state.

At 1906, generated control signals may be sent to devices. For example, the controller 170 may have generated a control signal to turn on or turn off the device 1220, which may be a light switch. The control signal may be sent to the device 220, which may implement the control signal. The controller 170 may generate and send any number of control signals to any number of devices based on the room counts. The determination of room counts may be continuous as the sensor generate sensor counts, and the generation of control signals in response to the room counts may also be continuous.

Embodiments disclosed herein may use one or more sensors. In general, a "sensor" may refer to any device that can obtain information about its environment. Sensors may be described by the type of information they collect. For example, sensor types as disclosed herein may include motion, smoke, carbon monoxide, proximity, temperature, time, physical orientation, acceleration, location, and the like. A sensor also may be described in terms of the particular physical device that obtains the environmental information. For example, an accelerometer may obtain acceleration information, and thus may be used as a general motion sensor and/or an acceleration sensor. A sensor also may be described in terms of the specific hardware components used to implement the sensor. For example, a temperature sensor may include a thermistor, thermocouple, resistance temperature detector, integrated circuit temperature detector, or combinations thereof. In some cases, a sensor may operate as multiple sensor types sequentially or concurrently, such as where a temperature sensor is used to detect a change in temperature, as well as the presence of a person or animal.

In general, a "sensor" as disclosed herein may include multiple sensors or sub-sensors, such as where a position sensor includes both a global positioning sensor (GPS) as well as a wireless network sensor, which provides data that can be correlated with known wireless networks to obtain location information. Multiple sensors may be arranged in a single physical housing, such as where a single device includes movement, temperature, magnetic, and/or other sensors. Such a housing also may be referred to as a sensor or a sensor device. For clarity, sensors are described with respect to the particular functions they perform and/or the particular physical hardware used, when such specification is necessary for understanding of the embodiments disclosed herein.

Figure 20:
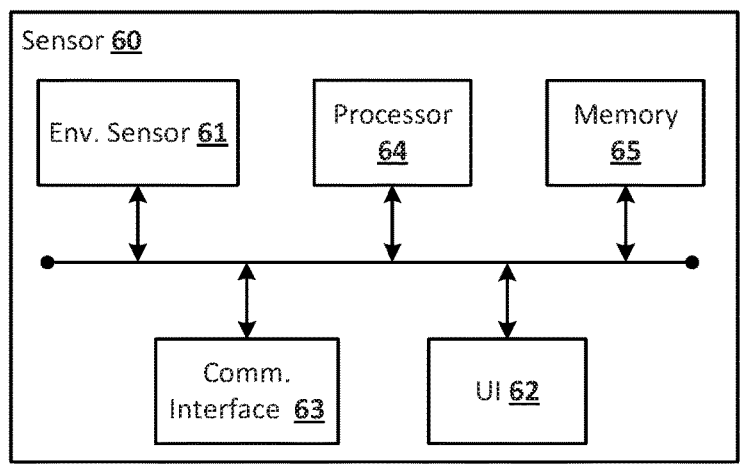
FIG. 20 shows a computing device according to an embodiment of the disclosed subject matter.

A sensor may include hardware in addition to the specific physical sensor that obtains information about the environment. FIG. 20 shows an example sensor as disclosed herein. The sensor 60 may include an environmental sensor 61, such as a temperature sensor, smoke sensor, carbon monoxide sensor, motion sensor, accelerometer, proximity sensor, passive infrared (PIR) sensor, magnetic field sensor, radio frequency (RF) sensor, light sensor, humidity sensor, or any other suitable environmental sensor, that obtains a corresponding type of information about the environment in which the sensor 60 is located. A processor 64 may receive and analyze data obtained by the sensor 61, control operation of other components of the sensor 60, and process communication between the sensor and other devices. The processor 64 may execute instructions stored on a computer-readable memory 65. The memory 65 or another memory in the sensor 60 may also store environmental data obtained by the sensor 61. A communication interface 63, such as a Wi-Fi or other wireless interface, Ethernet or other local network interface, or the like may allow for communication by the sensor 60 with other devices. A user interface (UI) 62 may provide information and/or receive input from a user of the sensor. The UI 62 may include, for example, a speaker to output an audible alarm when an event is detected by the sensor 60. Alternatively, or in addition, the UI 62 may include a light to be activated when an event is detected by the sensor 60. The user interface may be relatively minimal, such as a limited-output display, or it may be a full-featured interface such as a touchscreen. Components within the sensor 60 may transmit and receive information to and from one another via an internal bus or other mechanism as will be readily understood by one of skill in the art. One or more components may be implemented in a single physical arrangement, such as where multiple components are implemented on a single integrated circuit. Sensors as disclosed herein may include other components, and/or may not include all of the illustrative components shown.

Sensors as disclosed herein may operate within a communication network, such as a conventional wireless network, and/or a sensor-specific network through which sensors may communicate with one another and/or with dedicated other devices. In some configurations one or more sensors may provide information to one or more other sensors, to a central controller, or to any other device capable of communicating on a network with the one or more sensors. A central controller may be general- or special-purpose. For example, one type of central controller is a home automation network, that collects and analyzes data from one or more sensors within the home. Another example of a central controller is a special-purpose controller that is dedicated to a subset of functions, such as a security controller that collects and analyzes sensor data primarily or exclusively as it relates to various security considerations for a location. A central controller may be located locally with respect to the sensors with which it communicates and from which it obtains sensor data, such as in the case where it is positioned within a home that includes a home automation and/or sensor network. Alternatively or in addition, a central controller as disclosed herein may be remote from the sensors, such as where the central controller is implemented as a cloud-based system that communicates with multiple sensors, which may be located at multiple locations and may be local or remote with respect to one another.

Figure 21:
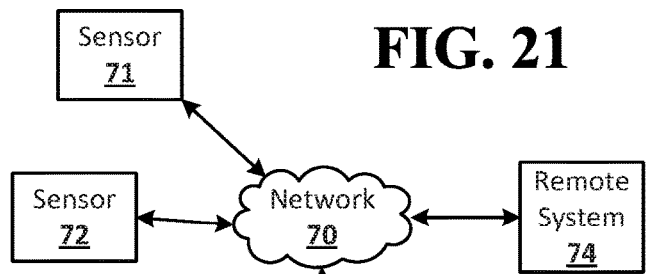
FIG. 21 shows a system according to an embodiment of the disclosed subject matter.

FIG. 21 shows an example of a sensor network as disclosed herein, which may be implemented over any suitable wired and/or wireless communication networks. One or more sensors 71, 72 may communicate via a local network 70, such as a Wi-Fi or other suitable network, with each other and/or with a controller 73. The controller may be a general- or special-purpose computer. The controller may, for example, receive, aggregate, and/or analyze environmental information received from the sensors 71, 72. The sensors 71, 72 and the controller 73 may be located locally to one another, such as within a single dwelling, office space, building, room, or the like, or they may be remote from each other, such as where the controller 73 is implemented in a remote system 74 such as a cloud-based reporting and/or analysis system. Alternatively or in addition, sensors may communicate directly with a remote system 74. The remote system 74 may, for example, aggregate data from multiple locations, provide instruction, software updates, and/or aggregated data to a controller 73 and/or sensors 71, 72.

For example, the hub computing device 100 may be an example of a controller 73 and the sensors 210 may be examples of sensors 71 and 72, as shown and described in further detail with respect to FIGS. 1-10.

The devices of the security system and smart-home environment of the disclosed subject matter may be communicatively connected via the network 70, which may be a mesh-type network such as Thread, which provides network architecture and/or protocols for devices to communicate with one another. Typical home networks may have a single device point of communications. Such networks may be prone to failure, such that devices of the network cannot communicate with one another when the single device point does not operate normally. The mesh-type network of Thread, which may be used in the security system of the disclosed subject matter, may avoid communication using a single device. That is, in the mesh-type network, such as network 70, there is no single point of communication that may fail so as to prohibit devices coupled to the network from communicating with one another.

The communication and network protocols used by the devices communicatively coupled to the network 70 may provide secure communications, minimize the amount of power used (i.e., be power efficient), and support a wide variety of devices and/or products in a home, such as appliances, access control, climate control, energy management, lighting, safety, and security. For example, the protocols supported by the network and the devices connected thereto may have an open protocol which may carry IPv6 natively.

The Thread network, such as network 70, may be easy to set up and secure to use. The network 70 may use an authentication scheme, AES (Advanced Encryption Standard) encryption, or the like to reduce and/or minimize security holes that exist in other wireless protocols. The Thread network may be scalable to connect devices (e.g., 2, 5, 10, 20, 50, 100, 150, 200, or more devices) into a single network supporting multiple hops (e.g., so as to provide communications between devices when one or more nodes of the network is not operating normally). The network 70, which may be a Thread network, may provide security at the network and application layers. One or more devices communicatively coupled to the network 70 (e.g., controller 73, remote system 74, and the like) may store product install codes to ensure only authorized devices can join the network 70. One or more operations and communications of network 70 may use cryptography, such as public-key cryptography.

The devices communicatively coupled to the network 70 of the smart-home environment and/or security system disclosed herein may low power consumption and/or reduced power consumption. That is, devices efficiently communicate to with one another and operate to provide functionality to the user, where the devices may have reduced battery size and increased battery lifetimes over conventional devices. The devices may include sleep modes to increase battery life and reduce power requirements. For example, communications between devices coupled to the network 70 may use the power-efficient IEEE 802.15.4 MAC/PHY protocol. In embodiments of the disclosed subject matter, short messaging between devices on the network 70 may conserve bandwidth and power. The routing protocol of the network 70 may reduce network overhead and latency. The communication interfaces of the devices coupled to the smart-home environment may include wireless system-on-chips to support the low-power, secure, stable, and/or scalable communications network 70.

The sensor network shown in FIG. 21 may be an example of a smart-home environment. The depicted smart-home environment may include a structure, a house, office building, garage, mobile home, or the like. The devices of the smart home environment, such as the sensors 71, 72, the controller 73, and the network 70 may be integrated into a smart-home environment that does not include an entire structure, such as an apartment, condominium, or office space.

The smart home environment can control and/or be coupled to devices outside of the structure. For example, one or more of the sensors 71, 72 may be located outside the structure, for example, at one or more distances from the structure (e.g., sensors 71, 72 may be disposed outside the structure, at points along a land perimeter on which the structure is located, and the like. One or more of the devices in the smart home environment need not physically be within the structure. For example, the controller 73 which may receive input from the sensors 71, 72 may be located outside of the structure.

The structure of the smart-home environment may include a plurality of rooms, separated at least partly from each other via walls. The walls can include interior walls or exterior walls. Each room can further include a floor and a ceiling. Devices of the smart-home environment, such as the sensors 71, 72, may be mounted on, integrated with and/or supported by a wall, floor, or ceiling of the structure.

The smart-home environment including the sensor network shown in FIG. 21 may include a plurality of devices, including intelligent, multi-sensing, network-connected devices that can integrate seamlessly with each other and/or with a central server or a cloud-computing system (e.g., controller 73 and/or remote system 74) to provide home-security and smart-home features. The smart-home environment may include one or more intelligent, multi-sensing, network-connected thermostats (e.g., "smart thermostats"), one or more intelligent, network-connected, multi-sensing hazard detection units (e.g., "smart hazard detectors"), and one or more intelligent, multi-sensing, network-connected entryway interface devices (e.g., "smart doorbells"). The smart hazard detectors, smart thermostats, and smart doorbells may be the sensors 71, 72 shown in FIG. 21.

According to embodiments of the disclosed subject matter, the smart thermostat may detect ambient climate characteristics (e.g., temperature and/or humidity) and may control an HVAC (heating, ventilating, and air conditioning) system accordingly of the structure. For example, the ambient client characteristics may be detected by sensors 71, 72 shown in FIG. 21, and the controller 73 may control the HVAC system (not shown) of the structure.

A smart hazard detector may detect the presence of a hazardous substance or a substance indicative of a hazardous substance (e.g., smoke, fire, or carbon monoxide). For example, smoke, fire, and/or carbon monoxide may be detected by sensors 71, 72 shown in FIG. 21, and the controller 73 may control an alarm system to provide a visual and/or audible alarm to the user of the smart-home environment.

A smart doorbell may control doorbell functionality, detect a person's approach to or departure from a location (e.g., an outer door to the structure), and announce a person's approach or departure from the structure via audible and/or visual message that is output by a speaker and/or a display coupled to, for example, the controller 73.

In some embodiments, the smart-home environment of the sensor network shown in FIG. 21 may include one or more intelligent, multi-sensing, network-connected wall switches (e.g., "smart wall switches"), one or more intelligent, multi-sensing, network-connected wall plug interfaces (e.g., "smart wall plugs"). The smart wall switches and/or smart wall plugs may be the sensors 71, 72 shown in FIG. 21. The smart wall switches may detect ambient lighting conditions, and control a power and/or dim state of one or more lights. For example, the sensors 71, 72, may detect the ambient lighting conditions, and the controller 73 may control the power to one or more lights (not shown) in the smart-home environment. The smart wall switches may also control a power state or speed of a fan, such as a ceiling fan. For example, sensors 72, 72 may detect the power and/or speed of a fan, and the controller 73 may adjusting the power and/or speed of the fan, accordingly. The smart wall plugs may control supply of power to one or more wall plugs (e.g., such that power is not supplied to the plug if nobody is detected to be within the smart-home environment). For example, one of the smart wall plugs may controls supply of power to a lamp (not shown).

In embodiments of the disclosed subject matter, the smart-home environment may include one or more intelligent, multi-sensing, network-connected entry detectors (e.g., "smart entry detectors"). The sensors 71, 72 shown in FIG. 21 may be the smart entry detectors. The illustrated smart entry detectors (e.g., sensors 71, 72) may be disposed at one or more windows, doors, and other entry points of the smart-home environment for detecting when a window, door, or other entry point is opened, broken, breached, and/or compromised. The smart entry detectors may generate a corresponding signal to be provided to the controller 73 and/or the remote system 74 when a window or door is opened, closed, breached, and/or compromised. In some embodiments of the disclosed subject matter, the alarm system, which may be included with controller 73 and/or coupled to the network 70 may not arm unless all smart entry detectors (e.g., sensors 71, 72) indicate that all doors, windows, entryways, and the like are closed and/or that all smart entry detectors are armed.

The smart-home environment of the sensor network shown in FIG. 21 can include one or more intelligent, multi-sensing, network-connected doorknobs (e.g., "smart doorknob"). For example, the sensors 71, 72 may be coupled to a doorknob of a door (e.g., doorknobs 122 located on external doors of the structure of the smart-home environment). However, it should be appreciated that smart doorknobs can be provided on external and/or internal doors of the smart-home environment.

The smart thermostats, the smart hazard detectors, the smart doorbells, the smart wall switches, the smart wall plugs, the smart entry detectors, the smart doorknobs, the keypads, and other devices of the smart-home environment (e.g., as illustrated as sensors 71, 72 of FIG. 21 can be communicatively coupled to each other via the network 70, and to the controller 73 and/or remote system 74 to provide security, safety, and/or comfort for the smart home environment).

A user can interact with one or more of the network-connected smart devices (e.g., via the network 70). For example, a user can communicate with one or more of the network-connected smart devices using a computer (e.g., a desktop computer, laptop computer, tablet, or the like) or other portable electronic device (e.g., a smartphone, a tablet, a key FOB, and the like). A webpage or application can be configured to receive communications from the user and control the one or more of the network-connected smart devices based on the communications and/or to present information about the device's operation to the user. For example, the user can view can arm or disarm the security system of the home.

One or more users can control one or more of the network-connected smart devices in the smart-home environment using a network-connected computer or portable electronic device. In some examples, some or all of the users (e.g., individuals who live in the home) can register their mobile device and/or key FOBs with the smart-home environment (e.g., with the controller 73). Such registration can be made at a central server (e.g., the controller 73 and/or the remote system 74) to authenticate the user and/or the electronic device as being associated with the smart-home environment, and to provide permission to the user to use the electronic device to control the network-connected smart devices and the security system of the smart-home environment. A user can use their registered electronic device to remotely control the network-connected smart devices and security system of the smart-home environment, such as when the occupant is at work or on vacation. The user may also use their registered electronic device to control the network-connected smart devices when the user is located inside the smart-home environment.

Alternatively, or in addition to registering electronic devices, the smart-home environment may make inferences about which individuals live in the home and are therefore users and which electronic devices are associated with those individuals. As such, the smart-home environment "learns" who is a user (e.g., an authorized user) and permits the electronic devices associated with those individuals to control the network-connected smart devices of the smart-home environment (e.g., devices communicatively coupled to the network 70). Various types of notices and other information may be provided to users via messages sent to one or more user electronic devices. For example, the messages can be sent via email, short message service (SMS), multimedia messaging service (MMS), unstructured supplementary service data (USSD), as well as any other type of messaging services and/or communication protocols.

The smart-home environment may include communication with devices outside of the smart-home environment but within a proximate geographical range of the home. For example, the smart-home environment may include an outdoor lighting system (not shown) that communicates information through the communication network 70 or directly to a central server or cloud-computing system (e.g., controller 73 and/or remote system 74) regarding detected movement and/or presence of people, animals, and any other objects and receives back commands for controlling the lighting accordingly.

The controller 73 and/or remote system 74 can control the outdoor lighting system based on information received from the other network-connected smart devices in the smart-home environment. For example, in the event, any of the network-connected smart devices, such as smart wall plugs located outdoors, detect movement at night time, the controller 73 and/or remote system 74 can activate the outdoor lighting system and/or other lights in the smart-home environment.

Figure 22:
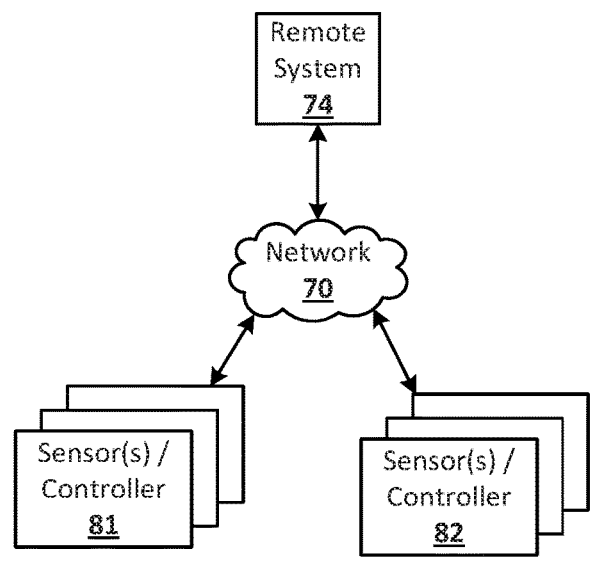
FIG. 22 shows a system according to an embodiment of the disclosed subject matter.

In some configurations, a remote system 74 may aggregate data from multiple locations, such as multiple buildings, multi-resident buildings, individual residences within a neighborhood, multiple neighborhoods, and the like. In general, multiple sensor/controller systems 81, 82 as previously described with respect to FIG. 22 may provide information to the remote system 74. The systems 81, 82 may provide data directly from one or more sensors as previously described, or the data may be aggregated and/or analyzed by local controllers such as the controller 73, which then communicates with the remote system 74. The remote system may aggregate and analyze the data from multiple locations, and may provide aggregate results to each location. For example, the remote system 74 may examine larger regions for common sensor data or trends in sensor data, and provide information on the identified commonality or environmental data trends to each local system 81, 82.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. Thus, the user may have control over how information is collected about the user and used by a system as disclosed herein.

Figure 23:
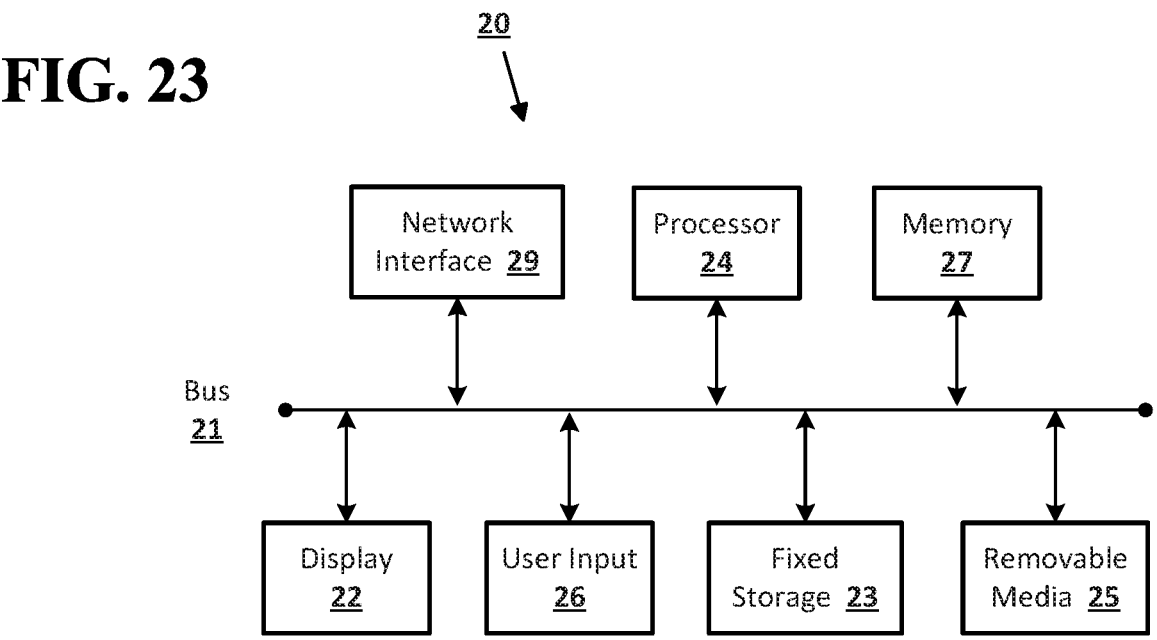
FIG. 23 shows a computer according to an embodiment of the disclosed subject matter.

Embodiments of the presently disclosed subject matter may be implemented in and used with a variety of computing devices. FIG. 23 is an example computing device 20 suitable for implementing embodiments of the presently disclosed subject matter. For example, the device 20 may be used to implement a controller, a device including sensors as disclosed herein, or the like. Alternatively or in addition, the device 20 may be, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components 25, 27, which may include RAM, ROM, and other memory, as previously noted. Applications resident with the computer 20 are generally stored on and accessed via a computer readable storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth(R), near-field, and the like. For example, the network interface 29 may allow the device to communicate with other computers via one or more local, wide-area, or other communication networks, as described in further detail herein.

Figure 24:
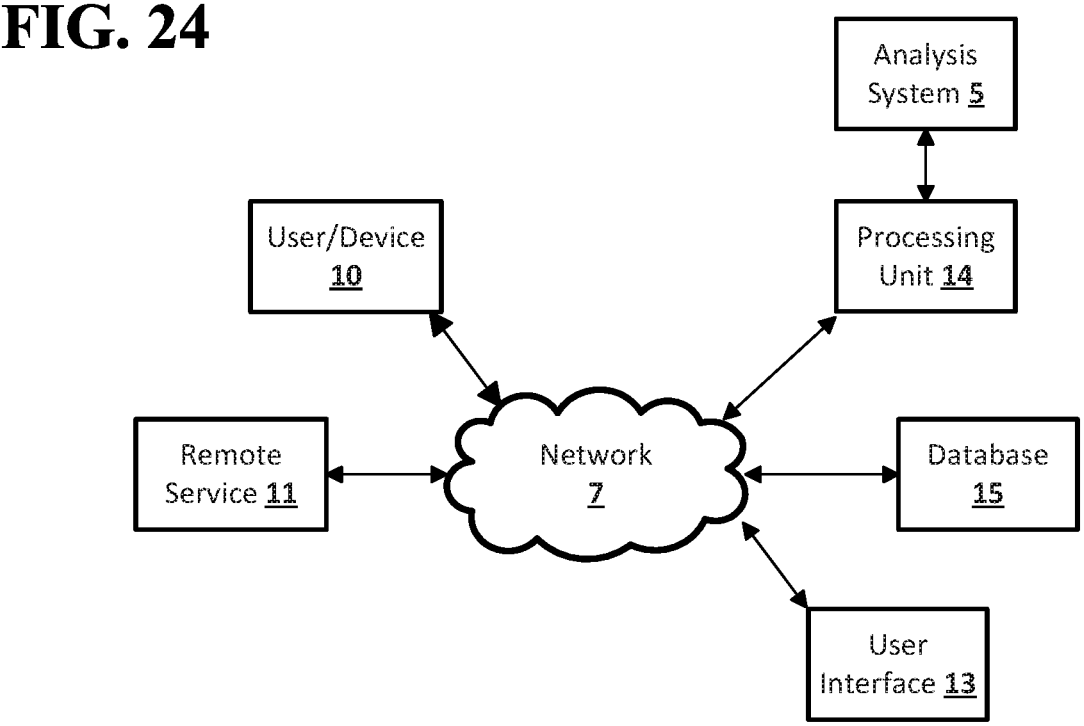
FIG. 24 shows a network configuration according to an embodiment of the disclosed subject matter.

FIG. 24 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. One or more processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as hard drives, USB (universal serial bus) drives, or any other machine readable storage medium, such that when the computer program code is loaded into and executed by a computer, the computer becomes an apparatus for practicing embodiments of the disclosed subject matter. When implemented on a general-purpose microprocessor, the computer program code may configure the microprocessor to become a special-purpose device, such as by creation of specific logic circuits as specified by the instructions.

Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented system for presence and directional motion detection comprising:
sensors in a structure of a smart home environment, each sensor configured to detect motion in the structure and generate a signal; and
and a hub computing device configured to receive signals from a sensor of the sensors, the sensor positioned in the structure, generate an indication of directional motion based on the signals from the sensor, wherein the indication of directional motion is generated without using signals from additional sensors, in response to the indication of directional motion, generate a control signal for a device in the structure and send the control signal to the device in the structure to be implemented by the device, receive signals from sensors in the structure, identify at least one substructure of the structure based on at least one pattern of motion determined based on the signals from the sensors, and update a map of the structure based on the at least one identified substructure and the location of one or of the sensors whose signals were used to determine the at least one pattern of motion, receive signals from sensors in the structure, receive context data comprising at least the time of day, identify at least one pattern of motion based on the context data and directional motion determined from the signals from the sensors, and update a model of motion patterns with the at least one identified pattern of motion, receive additional signals from the sensors in the structure, receive additional context data comprising at least the time of day, and determine if the additional context data and directional motion determined from the additional signals corresponds to at least one pattern of motion in the model of motion patterns or diverges from the patterns of motion in the model of motion patterns, receive sensor counts from sensors in the structures, the sensors counts comprising counts that are incremented when a sensor detects a person passing in front of the sensor in a first direction and decremented when the sensor detects a person passing in front of the sensor in a second direction, collate sensor counts from sensors that monitor entryways to the same rooms to generate room counts, wherein the room count for a room is the summation of sensor counts from sensors that monitor entryways to that room, generate a second control signal for the device in the structure based on at least one of the room counts, send the second control signal to the device in the structure to be implemented by the device.

2. The computer-implemented system of claim 1, wherein the hub computing device implements one or more machine learning systems to generate the indication of directional motion based on the signals from the sensor, identify the at least one substructure of the structure based on the at least one pattern of motion determined based on the signals from the sensors, and determine if the additional context data and directional motion determined from the additional signals corresponds to the at least one pattern of motion in the model of motion patterns or diverges from the patterns of motion in the model of motion patterns.

3. A computer-implemented method performed by a data processing apparatus comprising a hub computing device, the method comprising:
receiving, at the hub computing device, signals from a sensor positioned in a structure;

generating an indication of directional motion based on the signals from the sensor, wherein the indication of directional motion is generated without using signals from additional sensors;

in response to the indication of directional motion, generating a control signal for a device in the structure;

sending the control signal to the device in the structure to be implemented by the device;

receiving signals from sensors in the structure;

identifying at least one substructure of the structure based on at least one pattern of motion determined based on the signals from the sensors; and updating a map of the structure based on the at least one identified substructure and the location of one or of the sensors whose signals were used to determine the at least one pattern of motion.

4. The computer-implemented method of claim 3, further comprising:

receiving signals from sensors in the structure;

receiving context data comprising at least the time of day;

identifying at least one pattern of motion based on the context data and directional motion determined from the signals from the sensors; and updating a model of motion patterns with the at least one identified pattern of motion.

5. The computer-implemented method of claim 4, further comprising:

receiving additional signals from the sensors in the structure;

receiving additional context data comprising at least the time of day; and determining if the additional context data and directional motion determined from the additional signals corresponds to at least one pattern of motion in the model of motion patterns or diverges from the patterns of motion in the model of motion patterns.

6. The computer-implemented of claim 5, further comprising, when the additional context data and the directional motion determined from the additional signals corresponds to at least one pattern of motion in the model of motion patterns:

in response to determining that the additional context data and the directional motion determined from the additional signals corresponds to at least one pattern of motion in the model of motion patterns, generating a second control signal for the device in the structure; and sending the second control signal to the device in the structure to be implemented by the device.

7. The computer-implemented of claim 5, further comprising, when the additional context data and the directional motion determined from the additional signals diverges from the patterns of motion in the model of motion patterns:

in response to determining that the additional context data and the directional motion determined from the additional signals diverges from the patterns of motion in the model of motion patterns, generating an alert indication; and sending the alert indication to at least one communications device.

8. The computer-implemented method of claim 7, wherein the alert indication comprises an indication of unexpected motion or an indication of lack of expected motion.

9. The computer-implemented method of claim 3, wherein the sensor comprises a PIR sensor comprising a first sensor pad and a second sensor pad wherein the first sensor pad is configured to produce a positive pulse signal when the first sensor pad detects motion and the second sensor pad is configured to produce a negative pulse signal when the second sensor pad detects motion, an asymmetric lens sensor comprising at least two asymmetric lenses or apertures that focus radiation on a detector and cause the detector to generate pulse signals of different sizes based on the size of a lens or aperture of the at least two asymmetric lenses or apertures that focused radiation on the detector, a radar sensor, or an ultrasonic sensor.

10. The computer-implemented method of claim 7, wherein the alert indication comprises an indication of unexpected motion or an indication of lack of expected motion.

11. A computer-implemented method performed by a data processing apparatus comprising a hub computing device, the method comprising:

receiving, at the hub computing device, signals from a sensor positioned in a structure;

generating an indication of directional motion based on the signals from the sensor, wherein the indication of directional motion is generated without using signals from additional sensors;

in response to the indication of directional motion, generating a control signal for a device in the structure; and sending the control signal to the device in the structure to be implemented by the device, wherein the sensor comprises a PIR sensor comprising a first sensor pad and a second sensor pad wherein the first sensor pad is configured to produce a positive pulse signal when the first sensor pad detects motion and the second sensor pad is configured to produce a negative pulse signal when the second sensor pad detects motion, an asymmetric lens sensor comprising at least two asymmetric lenses or apertures that focus radiation on a detector and cause the detector to generate pulse signals of different sizes based on the size of a lens or aperture of the at least two asymmetric lenses or apertures that focused radiation on the detector, a radar sensor, or an ultrasonic sensor.

12. The computer-implemented method of claim 11, further comprising:

receiving signals from sensors in the structure;

identifying at least one substructure of the structure based on at least one pattern of motion determined based on the signals from the sensors; and updating a map of the structure based on the at least one identified substructure and the location of one or of the sensors whose signals were used to determine the at least one pattern of motion.

13. The computer-implemented method of claim 11, further comprising:

receiving signals from sensors in the structure;

receiving context data comprising at least the time of day;

identifying at least one pattern of motion based on the context data and directional motion determined from the signals from the sensors; and updating a model of motion patterns with the at least one identified pattern of motion.

14. The computer-implemented method of claim 13, further comprising:

receiving additional signals from the sensors in the structure;

receiving additional context data comprising at least the time of day; and determining if the additional context data and directional motion determined from the additional signals corresponds to at least one pattern of motion in the model of motion patterns or diverges from the patterns of motion in the model of motion patterns.

15. The computer-implemented of claim 14, further comprising, when the additional context data and the directional motion determined from the additional signals corresponds to at least one pattern of motion in the model of motion patterns:
   in response to determining that the additional context data and the directional motion determined from the additional signals corresponds to at least one pattern of motion in the model of motion patterns, generating a second control signal for the device in the structure; and
   sending the second control signal to the device in the structure to be implemented by the device.

16. The computer-implemented of claim 14, further comprising, when the additional context data and the directional motion determined from the additional signals diverges from the patterns of motion in the model of motion patterns:
   in response to determining that the additional context data and the directional motion determined from the additional signals diverges from the patterns of motion in the model of motion patterns, generating an alert indication; and
   sending the alert indication to at least one communications device.

17. A computer-implemented system for presence and directional motion detection comprising:
   sensors in a structure of a smart home environment, each sensor configured to detect motion in the structure and generate a signal; and
   and a hub computing device configured to receive that signals from a sensor of the sensors, the sensor positioned the structure, generate an indication of directional motion based on the signals from the sensor, wherein the indication of directional motion is generated without using signals from additional sensors, in response to the indication of directional motion, generate a control signal for a device in the structure, send the control signal to the device in the structure to be implemented by the device, receive signals from sensors in the structure, identify at least one substructure of the structure based on at least one pattern of motion determined based on the signals from the sensors, and update a map of the structure based on the at least one identified substructure and the location of one or of the sensors whose signals were used to determine the at least one pattern of motion.

18. The computer-implemented system of claim 17, wherein the hub computing device is further configured to receive signals from sensors in the structure, receive context data comprising at least the time of day, identify at least one pattern of motion based on the context data and directional motion determined from the signals from the sensors, and update a model of motion patterns with the at least one identified pattern of motion.

19. The computer-implemented system of claim of claim 18, wherein the hub computing device is further configured to receive additional signals from the sensors in the structure, receive additional context data comprising at least the time of day, and determine if the additional context data and directional motion determined from the additional signals corresponds to at least one pattern of motion in the model of motion patterns or diverges from the patterns of motion in the model of motion patterns.

20. The computer-implemented system of claim 19, wherein the hub computing device is further configured to, when the additional context data and the directional motion determined from the additional signals corresponds to at least one pattern of motion in the model of motion patterns, in response to determining that the additional context data and the directional motion determined from the additional signals corresponds to at least one pattern of motion in the model of motion patterns, generate a second control signal for the device in the structure and send the second control signal to the device in the structure to be implemented by the device.

21. The computer-implemented system of claim 19, wherein the hub computing device is further configured to, when the additional context data and the directional motion determined from the additional signals diverges from the patterns of motion in the model of motion patterns, in response to determining that the additional context data and the directional motion determined from the additional signals diverges from the patterns of motion in the model of motion patterns, generate an alert indication and send the alert indication to at least one communications device.

22. The computer-implemented system of claim 21, wherein the alert indication comprises an indication of unexpected motion or an indication of lack of expected motion.

23. The computer-implemented system of claim 17, wherein the sensor comprises a PIR sensor comprising a first sensor pad and a second sensor pad wherein a first sensor pad is configured to produce a positive pulse signal when the first sensor pad detects motion and the second sensor pad is configured to produce a negative pulse signal when the second sensor pad detects motion, an asymmetric lens sensor comprising at least two asymmetric lenses or apertures that focus radiation on a detector and cause the detector to generate pulse signals of different sizes based on the size of a lens or aperture of the at least two asymmetric lenses or apertures that focused radiation on the detector, a radar sensor, or an ultrasonic sensor.

24. A computer-implemented system for presence and directional motion detection comprising:
   sensors in a structure of a smart home environment, each sensor configured to detect motion in the structure and generate a signal; and
   and a hub computing device configured to receive that signals from a sensor of the sensors, the sensor positioned the structure, generate an indication of directional motion based on the signals from the sensor, wherein the indication of directional motion is generated without using signals from additional sensors, in response to the indication of directional motion, generate a control signal for a device in the structure, and send the control signal to the device in the structure to be implemented by the device, wherein the sensor comprises a PIR sensor comprising a first sensor pad and a second sensor pad wherein a first sensor pad is configured to produce a positive pulse signal when the first sensor pad detects motion and the second sensor pad is configured to produce a negative pulse signal when the second sensor pad detects motion, an asymmetric lens sensor comprising at least two asymmetric lenses or apertures that focus radiation on a detector and cause the detector to generate pulse signals of different sizes based on the size of a lens or aperture of the at least two asymmetric lenses or apertures that focused radiation on the detector, a radar sensor, or an ultrasonic sensor.

25. The computer-implemented system of claim 24, wherein the hub computing device is further configured to receive signals from sensors in the structure, identify at least one substructure of the structure based on at least one pattern of motion determined based on the signals from the sensors, and update a map of the structure based on the at least one identified substructure and the location of one or of the sensors whose signals were used to determine the at least one pattern of motion.

26. The computer-implemented system of claim 24, wherein the hub computing device is further configured to receive signals from sensors in the structure, receive context data comprising at least the time of day, identify at least one pattern of motion based on the context data and directional motion determined from the signals from the sensors, and update a model of motion patterns with the at least one identified pattern of motion.

27. The computer-implemented system of claim of claim 26, wherein the hub computing device is further configured to receive additional signals from the sensors in the structure, receive additional context data comprising at least the time of day, and determine if the additional context data and directional motion determined from the additional signals corresponds to at least one pattern of motion in the model of motion patterns or diverges from the patterns of motion in the model of motion patterns.

28. The computer-implemented system of claim 27, wherein the hub computing device is further configured to, when the additional context data and the directional motion determined from the additional signals corresponds to at least one pattern of motion in the model of motion patterns, in response to determining that the additional context data and the directional motion determined from the additional signals corresponds to at least one pattern of motion in the model of motion patterns, generate a second control signal for the device in the structure and send the second control signal to the device in the structure to be implemented by the device.

29. The computer-implemented system of claim 27, wherein the hub computing device is further configured to, when the additional context data and the directional motion determined from the additional signals diverges from the patterns of motion in the model of motion patterns, in response to determining that the additional context data and the directional motion determined from the additional signals diverges from the patterns of motion in the model of motion patterns, generate an alert indication and send the alert indication to at least one communications device.

30. The computer-implemented system of claim 29, wherein the alert indication comprises an indication of unexpected motion or an indication of lack of expected motion.

\* \* \* \* \*